US012277550B2

(12) United States Patent
Everspaugh et al.

(10) Patent No.: US 12,277,550 B2
(45) Date of Patent: Apr. 15, 2025

(54) SYSTEMS AND METHODS FOR REQUESTING SECURE, ENCRYPTED COMMUNICATIONS ACROSS DISTRIBUTED COMPUTER NETWORKS FOR AUTHORIZING USE OF CRYPTOGRAPHY-BASED DIGITAL REPOSITORIES IN ORDER TO PERFORM BLOCKCHAIN OPERATIONS IN DECENTRALIZED APPLICATIONS

(71) Applicant: Coinbase, Inc., San Francisco, CA (US)

(72) Inventors: Adam Everspaugh, Evanston, IL (US); Michael Lodder, San Francisco, CA (US)

(73) Assignee: Coinbase, Inc., Oakland, CA (US)

( * ) Notice: Subject to any disclaimer, the term of this patent is extended or adjusted under 35 U.S.C. 154(b) by 146 days.

(21) Appl. No.: 17/591,397

(22) Filed: Feb. 2, 2022

(65) Prior Publication Data

US 2023/0245111 A1    Aug. 3, 2023

(51) Int. Cl.
| | | |
|---|---|---|
| *G06Q 20/38* | (2012.01) | |
| *G06Q 20/06* | (2012.01) | |
| *G06Q 20/22* | (2012.01) | |
| *G06Q 20/36* | (2012.01) | |
| *H04L 9/00* | (2022.01) | |

(52) U.S. Cl.
CPC ....... *G06Q 20/3825* (2013.01); *G06Q 20/223* (2013.01); *G06Q 20/36* (2013.01); *G06Q 20/3829* (2013.01); *H04L 9/50* (2022.05); *G06Q 20/065* (2013.01); *G06Q 20/38215* (2013.01); *G06Q 20/3827* (2013.01)

(58) Field of Classification Search
CPC .............. G06Q 20/065; G06Q 20/223; G06Q 20/38215; G06Q 20/3825; G06Q 20/3827; G06Q 20/3829; H04L 9/50
USPC .......................................................... 705/64
See application file for complete search history.

(56) References Cited

U.S. PATENT DOCUMENTS

| | | | | |
|---|---|---|---|---|
| 10,402,823 | B1* | 9/2019 | Vlasov | G06Q 20/065 |
| 11,238,447 | B2* | 2/2022 | Zhang | G06Q 20/3829 |
| 2002/0013898 | A1* | 1/2002 | Sudia | G06Q 20/3829 |
| | | | | 380/278 |
| 2005/0228986 | A1* | 10/2005 | Fukasawa | H04L 9/3263 |
| | | | | 713/156 |
| 2006/0059342 | A1* | 3/2006 | Medvinsky | H04N 21/26613 |
| | | | | 713/168 |
| 2016/0292680 | A1* | 10/2016 | Wilson, Jr. | H04L 9/30 |
| 2016/0358164 | A1* | 12/2016 | Liao | H04L 9/3247 |
| 2019/0164153 | A1* | 5/2019 | Agrawal | G06Q 20/065 |
| 2020/0020032 | A1* | 1/2020 | Bleznak | G06Q 20/3678 |

(Continued)

*Primary Examiner* — Mohammad A. Nilforoush
*Assistant Examiner* — Wodajo Getachew
(74) *Attorney, Agent, or Firm* — Foley & Lardner LLP

(57) ABSTRACT

Methods and systems for the use of multi-party computation ("MPC") key systems that involve the use of multiple parties, each of which hold respective private data that may be used to evaluate a computation without ever revealing any of the private data held by each party to perform blockchain operations. Using the MPC key systems, the methods and systems generate secure, encrypted communications across distributed computer networks for authorizing use of cryptography-based digital repositories in order to perform blockchain operations in decentralized applications.

20 Claims, 11 Drawing Sheets

(56) References Cited

U.S. PATENT DOCUMENTS

2020/0044863 A1\* 2/2020 Yadlin .................. G06F 9/54
2022/0318907 A1\* 10/2022 Bleznak ............ G06Q 20/223

\* cited by examiner

For each cosigner:

Cogen Input File

Does not leave device

Device Encryption Public Key

Device Encryption Private Key

Device Authentication Public Key

Device Authentication Private Key

Generate Key Pair

Generate Key Pair

SYSTEMS AND METHODS FOR REQUESTING SECURE, ENCRYPTED COMMUNICATIONS ACROSS DISTRIBUTED COMPUTER NETWORKS FOR AUTHORIZING USE OF CRYPTOGRAPHY-BASED DIGITAL REPOSITORIES IN ORDER TO PERFORM BLOCKCHAIN OPERATIONS IN DECENTRALIZED APPLICATIONS

BACKGROUND

In recent years, the use of blockchains and blockchain technology has exponentially increased. Blockchains comprise a list of records, called "blocks," that are "chained" together using cryptography. Each block may comprise data that is computed using a one-way function (e.g., a function that is practically impossible to invert or reverse-compute) of a previous block, a timestamp (e.g., indicating a creation and/or modification time), and additional data (e.g., transactional or operational data related to blockchain operations).

While publicity for blockchains and blockchain technology has been concentrated on its use for cryptocurrencies and smart contracts, blockchains and blockchain technology may be applicable to numerous technological avenues. A common theme of the technological avenues is the manner in which blockchains and blockchain technology are decentralized such that facilitation, management, and/or verification of blockchain-based operations is governed or administered not by any one authority but instead by a community of users. The blockchain may therefore remain distributed (e.g., on a network of computers that communicate and coordinate their actions by passing messages to one another), and in many cases public, through a digital ledger, which records the series of blocks forming the chain. Notably, because each block depends on a preceding block, edits to existing blocks in the chain may not be made without affecting subsequent blocks.

Furthermore, updates to the blockchain (e.g., the addition of new blocks) may include incentivization systems that reward community members for the generation of the updates while also ensuring a consensus by the community. By doing so, the proliferation of the blockchain may proceed indefinitely.

SUMMARY

Methods and systems are described herein for novel uses and/or improvements to blockchains and blockchain technology. In particular, the methods and systems describe the use of, and improvements to, conventional digital key signing processes by using secure multi-party computation ("MPC"). For example, conventional key-share systems rely on a public-private key configuration where the security of the system is tied to the private key remaining private. MPC involves the use of multiple parties, each of which holds respective private data that may be used to evaluate a computation without ever revealing any of the private data held by each party. When using MPC in a digital key signing process, the use of MPC lessens the risk of unauthorized access as multiple keys would be needed by the unauthorized party. However, this creates a critical flaw in MPC-based key operations as the loss of any one key may result in the loss of digital assets for all of the parties and/or a reduce efficiency in conducting blockchain operations.

The methods and systems described herein overcome this problem through the use of separate device approval and signing policies for a cohort in an MPC-key based system. For example, by defining separate polices for signing (e.g., conducting a blockchain operation) and approval of device (e.g., to ensure that requests to create and/or contribute to a digital signature are from only approved devices), the methods and systems described overcome the technical challenges described above. For example, by defining the separate policies during creation of the cohort, the methods and systems facilitate threshold signing requirements for improved efficiency in the signing process and deter hacking or other cyber-attacks, while still maintaining separate independent key recovery mechanisms in case a cohort device is lost. Furthermore, the system and methods achieve this without introducing additional security risks.

The methods and systems also introduce increase security through the use of MPC-based key operations in which the MPC relies on partial private keys. In such cases, a partial private key is maintained online (e.g., in a hot wallet), whereas other partial private keys may remain offline. Furthermore, due to the use of the partial private keys, the exposure of the online partial private key does not in and of itself create a security risk (e.g., as multiple partial private keys, including an offline partial key, are required for conducting blockchain operations), and the loss of the offline partial private key (e.g., stored on a user device) does not create a risk of the loss of digital assets (e.g., as the online partial private key may be used to recover the offline private partial key).

In some aspects, systems and methods are described for requesting secure, encrypted communications across distributed computer networks for authorizing use of cryptography-based digital repositories in order to perform blockchain operations in decentralized applications. For example, the system may generate, at a remote server, a first cohort for a first user account, wherein the first cohort includes a plurality of user devices authorized to contribute to a digital signing process for blockchain operations corresponding to a first cryptography-based storage application for the first user account. The system may receive, at the remote server from a first user device, a first user request to initiate a blockchain operation for the first cohort, wherein the first user request includes a first device identifier. The system may authorize, at the remote server, the first user device based on the first device identifier. The system may, in response to authorizing the first user device based on the first device identifier, transmit, to a second user device, a first signing request to contribute to the digital signing process for the blockchain operation. The system may receive, at the remote server from the second user device, a first response to the first signing request, wherein the first response comprises an encrypted communication and a second device identifier, wherein the encrypted communication comprises a contribution to the digital signing process based on a second partial private key, wherein the second partial private key is stored on the second user device. The system may authorize, at the remote server, the second user device based on the second device identifier. The system may, in response to authorizing the second user device based on the second device identifier, transmit, to the first user device, the encrypted communication, wherein the encrypted communication is used to generate a completed digital signature using a first partial private key, wherein the first partial private key is stored on the first user device, and wherein the completed digital signature is used to perform the blockchain operation.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIGS. 1A-C each show an illustrative diagram for a key generation ceremony, in accordance with one or more embodiments.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1B:
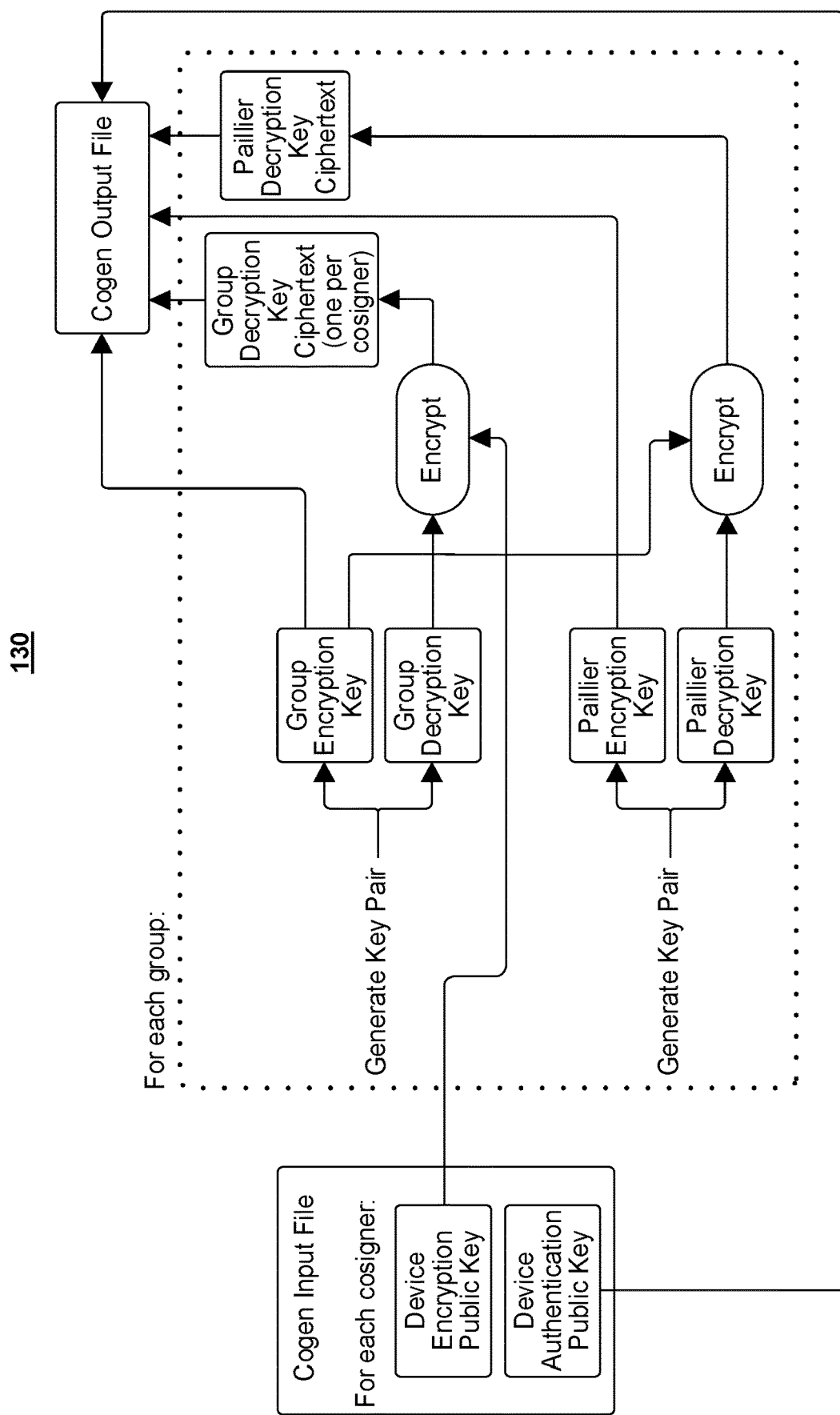
Figure 1C:
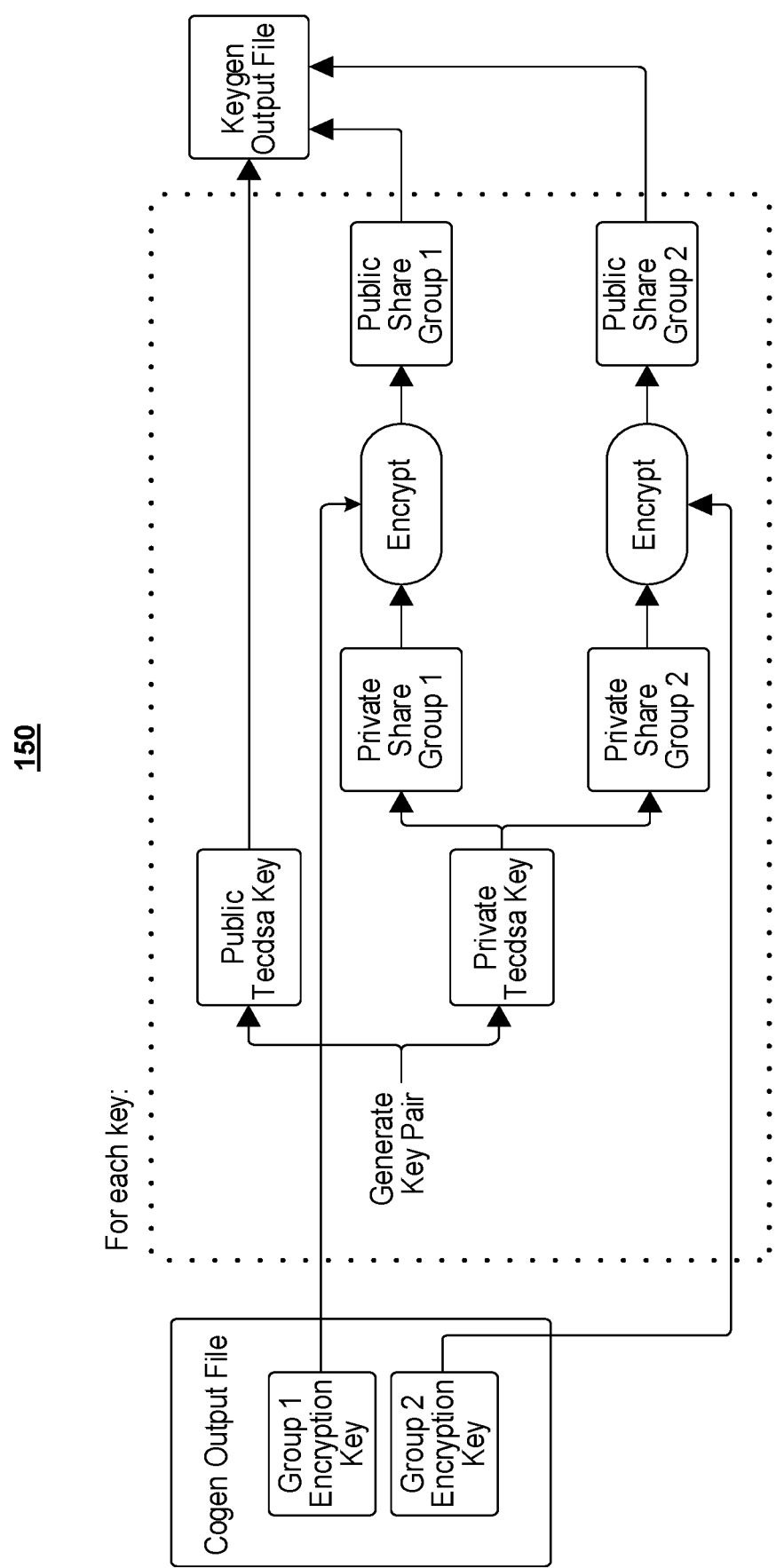

FIGS. 1A-C show illustrative diagrams for multi-party key creation for one or more cohorts. For example, the components shown in FIGS. 1A-C may be used to generate secure, encrypted communications across distributed computer networks for authorizing use of cryptography-based digital repositories in order to perform blockchain operations in decentralized applications. FIGS. 1A-C show illustrative diagrams for key creation in a multi-party computation key system. MPC involves the use of multiple parties, each of which holds respective private data that may be used to evaluate a computation without ever revealing any of the private data held by each party. For example, each party of the multiple parties may possess private data (e.g., $d_1$, $d_2$, ..., $d_N$). Together, the parties may use their respective private data to compute a value of a public function: (e.g., $F(d_1, d_2, \ldots, d_N)$). While the private data is used to compute a value based on the function, the private data is kept private during that process.

The use of an MPC-based key lessens the risk involved with the loss of a private key and/or the private key being accessed by unauthorized parties. For example, conventional key-share systems rely on a public-private key configuration where the security of the system is tied to the private key remaining private. In some cases, these keys are stored in various cryptography-based digital repositories (or digital wallets). These digital wallets may have various configurations, typically categorized by whether the private key is held online or offline. For example, a hot storage wallet has a private key held online. A cold storage wallet has a private key held offline, and a hardware wallet has a private key held offline and on a physical device (e.g., a thumb drive). While holding a private key offline and/or tying the private key to a physical device is beneficial from a security perspective, this creates practical problems when attempting to conduct operations using the digital wallet. For example, to conduct an operation, a user must be able to access the private key from its offline location and/or the physical device. This is particularly burdensome for MPC-based key operations as it requires each user (e.g., corresponding to a respective private key) to be available at a given time.

Furthermore, the use of a private key stored at an offline location and/or the physical device increases the risk that the offline location becomes inaccessible and/or the physical device is lost. In such cases, the digital wallet and any digital assets therein may be lost as well. This creates a critical flaw in MPC-based key operations as the loss of any one key may result in the loss of digital assets for all of the parties. The methods and systems described herein overcome this problem through the use of threshold signing requirements, separate approval and signing policies, independent key recovery mechanisms, and cohort/group key creation. More specifically, the methods and systems described herein alleviate flaws in the MPC-based key operations by creating MPC-based key operations in which the MPC relies on partial private keys. In such cases, a partial private key is maintained online (e.g., in a hot wallet), whereas other partial private keys may remain offline. Furthermore, due to the use of the partial private keys, the exposure of the online partial private key does not in and of itself create a security risk (e.g., as multiple partial private keys, including an offline partial key, are required for conducting blockchain operations), and the loss of the offline partial private key (e.g., stored on a user device) does not create a risk of the loss of digital assets (e.g., as the online partial private key may be used to recover the offline private partial key).

The MPC-based key operations maintain flexibility in the algorithm used. For example, the system may use online MPC algorithms such as the Gennaro and Goldfeder MPC algorithm and the Lindell et al. MPC algorithm. The online MPC algorithms have two limitations that restrict their use in conventional systems. First, they require users to wait for an MPC protocol to undergo up to eight to twelve signatures rounds, which can create latency issues. Second, they require the use of online storage for private keys. Due to the use of partial private keys (e.g., comprises an online and offline pair), the system may use online MPC algorithms. Furthermore, given that the online requirement for the online MPC algorithms is satisfied by the online partial private key, the system may use the online MPC algorithms while maintaining the offline partial private key (e.g., increasing overall security).

Additionally, the MPC-based key operations used by the system may include offline and/or online hybrid MPC algorithms. For example, the system may use MPC algorithms that include dynamic key refreshes (e.g., private key shares may be dynamically updated/modified at a given interval) and/or dynamic approval and/or signing policies. These dynamic policies are made possible by the online partial private key. Thus, the system introduces the enhanced security of dynamic systems, while still maintaining the security of offline systems (e.g., through the use of the offline partial private key).

Finally, the MPC-based key operations may use threshold key-signing policies in which only a threshold number of users (e.g., partial private keys corresponding to a user) are required. Upon determination by the system that the threshold is met, the system may allow a subsequent user (e.g., an online user) to finalize and perform a blockchain operation. As such, the system allows for the use of MPC-based key operations without requiring all parties to be online and/or available at the same time.

For example, FIGS. 1A-C show illustrative diagrams for key creation in an MPC key system. As shown in FIG. 1A, diagram 100 illustrates the steps for each cosigner (e.g., user device or simply "user") when generating a private key share, which may in some embodiments comprise a partial private key share. For example, the system (e.g., a custodial platform for blockchain operations) may generate keys for an MPC key using a key generation ceremony (e.g., a keygen ceremony). To do this, the system may create a cohort of cosigners in a cohort generation ceremony (e.g., a cogen ceremony). In some embodiments, a user device may refer to a cosigner for signing blockchain operations. If the cosigner is a "human" cosigner (e.g., corresponding to a user device operated by a user as opposed to a custodial platform for blockchain operations), the cosigner may use a hardware solution (e.g., a hardware wallet) for protecting certificate authority root keys. The hardware wallet is a hardware solution (e.g., YubiHSM) for protecting certificate authority root keys and/or high-value private keys from being copied by attackers, malware, and malicious insiders. If the cosigner is a server cosigner (e.g., corresponding to a user device operated by a custodial platform for blockchain operations), the cosigner may use a key management service (e.g., "KMS").

For example, as shown in diagram 100 the system may generate a public and private key pair for each cosigner (e.g., each user device). The key pairs may include a device encryption key pair and a device authentication key pair. The device encryption key pair may comprise a device encryption public key and a device encryption private key. The device encryption private key may be stored only on the user device (e.g., the device encryption private key does not leave the user device to enhance security). The device encryption public key may then be used to generate a cogen input file (e.g., a cohort generation input file). The device encryption key pair may be used to generate encryption keys for digital signing policies. The key pairs may also include a device authentication key pair. The device authentication key pair may comprise a device authentication public key and a device authentication private key. The device authentication private key may be stored only on the user device (e.g., the device authentication private key does not leave the user device to enhance security). The device authentication public key may then be used to generate a cogen input file (e.g., a cohort generation input file). The device authentication key pair may be used to generate authentication keys for device authentication. For example, the system may authenticate devices during distributed key generation or distributed digital signing operations in order to provide enhanced security (e.g., responding to requests only from authenticated devices).

For example, in some embodiments, the system may generate, for a first user device of a plurality of user devices, a first cogen input file, wherein the first cogen input file is based on a public portion of a first device encryption key pair and a public portion of a first device authentication key pair. The system may then generate another cogen input file for another user device. For example, the system may generate, for a second user device of a plurality of user devices, a second cogen input file, wherein the second cogen input file is based on a public portion of a second device encryption key pair and a public portion of a second device authentication key pair. In such cases, the public keys may comprise non-sensitive data, whereas the private keys comprise sensitive data.

As shown in FIG. 1B, diagram 130 illustrates the steps for each cohort (e.g., a plurality of user devices) when generating a group key based on a cogen input file for various user devices in a cohort bloc. For example, a cohort bloc may comprise various user devices, each with respective private keys that nonetheless correspond to a single entity or user. As one example, a cohort bloc may include a first user device used for performing blockchain operations (e.g., contributing to a digital signing process) and a second user device used as a recovery key in case the first user device is lost. The second user device may have the same or different rights from the first. For example, the second user device may not have the credentials necessary to perform blockchain operations. In diagram 130, the cogen input files generated for respective devices in diagram 100 (referred to herein collectively as the cogen input file) is used to generate a cogen output file. The cogen output file is based on gathering encryption and authentication keys for cosigners who are part of the cohort.

As shown in FIG. 1B, diagram 130 illustrates a cogen ceremony for each cohort bloc (e.g., each group of user devices with a plurality of user devices within a cohort). For each cohort bloc, the system may generate a cohort generation output file (i.e., "cogen output file"). The cogen output file may comprise a bloc encryption key, a Paillier encryption key, a Paillier decryption key ciphertext, a bloc decryption key ciphertext, a public portion of the first device authentication key pair, and/or a public portion of the second device authentication key pair. For example, when generating the cogen output file, the system may determine a subset of the plurality of user devices for inclusion in a first cohort bloc, generate a bloc encryption key pair for the first cohort bloc, wherein the bloc encryption key pair for the first cohort bloc comprises a bloc encryption key and a bloc decryption key, generate a Paillier encryption key pair for the first cohort bloc, wherein the Paillier encryption key pair for the first cohort bloc comprises a Paillier encryption key and a Paillier decryption key. In some embodiments, the system may use the bloc encryption key to encrypt the Paillier decryption key, and generate a Paillier decryption key ciphertext for inclusion in the first cogen output file. It should be noted that the system may use any asymmetric algorithm for public key cryptography.

It should further be noted that the use of any asymmetric algorithm for public key cryptography may be used for key generation, encryption, and/or decryption in various embodiments. For example, during key generation, the system may select two numbers (e.g., two large prime numbers p and q), which should be selected randomly and independently of each other such that gcd(pq, (p−1)(q−1))= 1. The system may then compute n=pq and λ=1 cm(p−1, q−1), wherein the 1 cm comprises the least common multiple. The system may then select a random integer g and ensures that n divides the order of g using the modular multiplicative inverse, μ, based on:

$$g \in \mathbb{Z}_{n^2}^*$$

$$\mu = \left(L(g^\lambda \bmod n^2)\right)^{-1} \bmod n,$$

$$L(x) = \frac{x-1}{n}$$

The system may then determine the public encryption key (n,g) and the private decryption key (λ, μ). During encryption, the system may use message, m, select a random, r, and compute a ciphertext based on:

$$0 \leq m < n$$

$$0 < r < n$$

$$c = g^m \cdot r^n \bmod n^2$$

During decryption, the system may have ciphertext, c, to decrypt and compute the plaintext message, m, based on:

$$c \in \mathbb{Z}_{n^2}^*$$

$$m = L(c^\lambda \bmod n^2) \cdot \mu \bmod n$$

For example, for each group or cohort bloc, the system may generate a group encryption key pair (or cohort bloc encryption key pair) and an asymmetric algorithm key pair (e.g., a Paillier encryption key pair). The group encryption key pair may comprise a group encryption key which is included in the cogen output file and a group decryption key, which is encrypted using the device encryption public key from the cogen input file to generate a group decryption key ciphertext. The system may generate one group decryption key ciphertext for each cosigner (e.g., for each user device). The asymmetric algorithm key pair (e.g., a Paillier encryption key pair) may comprise an asymmetric algorithm encryption key and an asymmetric algorithm decryption key. The asymmetric algorithm encryption key and the asymmetric algorithm decryption key may be encrypted to generate an asymmetric algorithm decryption key ciphertext.

The system may then generate a cogen output file that comprises a cohort bloc encryption key, an asymmetric algorithm encryption key, an asymmetric algorithm decryption key ciphertext, a cohort bloc decryption key ciphertext, a public portion of the first device authentication key pair, and/or a public portion of the second device authentication key pair. The cogen output file is then used as an input to encrypt the key materials that are generated in the keygen ceremony. For example, the system may generate a cohort key generation file, wherein the first cogen output file is used to encrypt the cohort key generation file.

As shown in FIG. 1C, diagram 130 illustrates a key generation (i.e., "keygen") ceremony for each key to generate a key generation output file (e.g., "keygen output file" or "cohort key gen file"). For example, the system may generate a cohort key generation file for each user device (e.g., corresponding to a respective cohort key for the MPC key system). The system may then transmit, to the user device, the cohort key generation file, wherein the cohort key generation file comprises a cohort public key for a digital signature algorithm and causes a first partial private key for the digital signature algorithm to be generated on the user device.

During the keygen ceremony, the cogen output file is used to generate a keygen output file. For example, for each key, the system may generate a key generation pair. The key generation pair may comprise a public digital signature algorithm key and a private digital signature algorithm key. In some embodiments, the public digital signature algorithm key and a private digital signature algorithm key may comprise an elliptic curve digital signature algorithm and/or may use a threshold signing policy. For example, the system may generate an MPC key system in which a threshold number of key shares are required to perform a blockchain operation.

The public digital signature algorithm key may then be included in the keygen output file. In contrast, the private digital signature algorithm key is used to create a private share for each cohort bloc. For example, the system may create a private share for each group of user devices that comprise a cohort bloc. The system may then use a respective cohort bloc encryption key for a given cohort bloc to encrypt the private share for a corresponding group. The encrypted private share is then used for a corresponding public share and provided in the keygen output file. As such, the keygen output file contains the materials (e.g., the instructions for generating private and/or partial private key shares on a user device) which will be used by cosigners (e.g., user devices) to sign messages (e.g., signing requests for performing blockchain operations) received by the system (e.g., a system coordinator).

Figure 2:
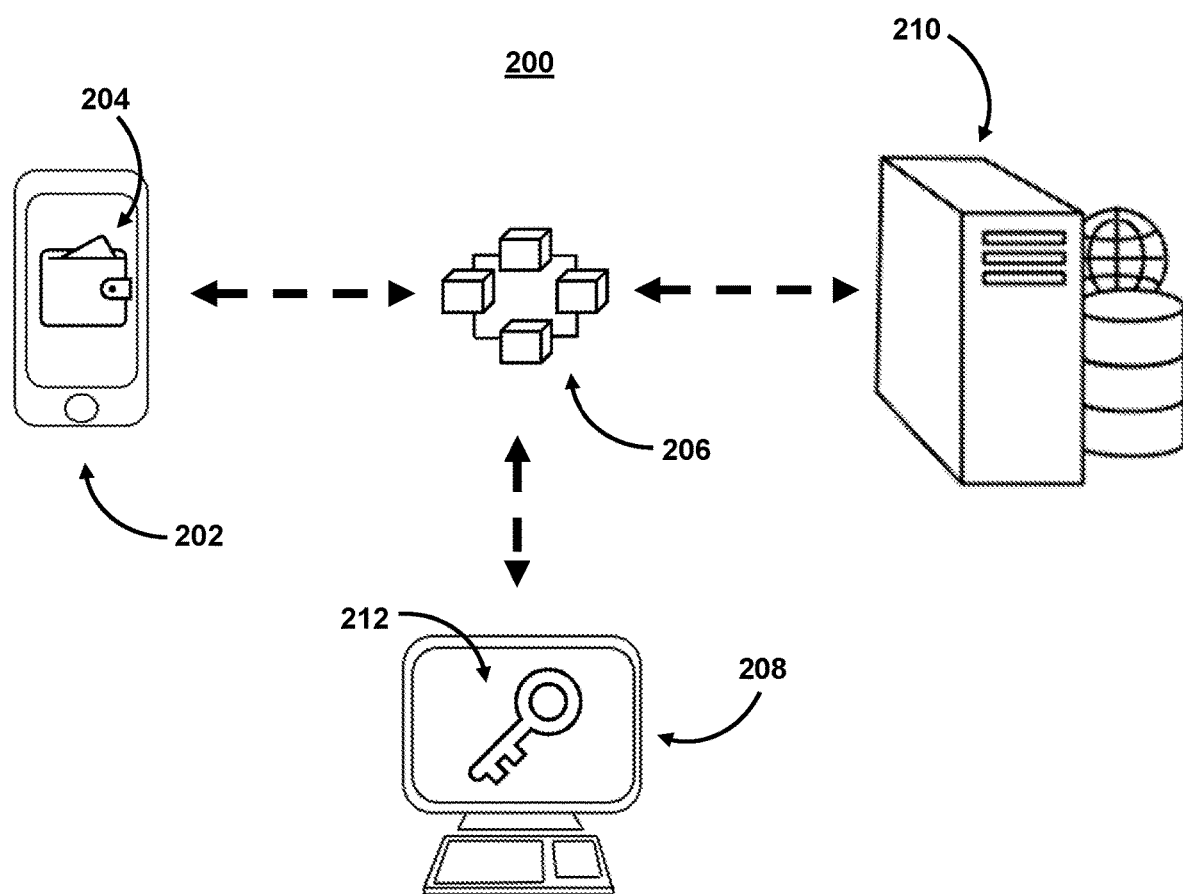
FIG. 2 shows an illustrative diagram for conducting blockchain operations, in accordance with one or more embodiments.

FIG. 2 shows an illustrative diagram for conducting blockchain operations, in accordance with one or more embodiments. For example, the diagram presents various components that may be used by a MPC key system in some embodiments. FIG. 2 includes user device 202. User device 202 may include a user interface. As referred to herein, a "user interface" may comprise a mechanism for human-computer interaction and communication on a device and may include inputs devices, display screens, keyboards, a mouse, and the appearance of a desktop. For example, a user interface may comprise a way a user interacts with an application or website using an MPC key system, and the user interface may display content related to performing blockchain operations based on an MPC key system and/or a digital signing process using an MPC key system. As referred to herein, "content" should be understood to mean an electronically consumable user asset, representations of goods or services (including nonfungible tokens), internet content (e.g., streaming content, downloadable content, webcasts, etc.), video data, audio data, image data, and/or textual data, etc.

As shown in FIG. 2, system 200 may include multiple user devices (e.g., user device 202, user device 208, and/or user device 210). For example, system 200 may comprise a distributed state machine, in which each of the components in FIG. 2 acts as a client of system 200. For example, system 200 (as well as other systems described herein) may comprise a large data structure that holds not only all accounts and balances but also a state machine, which can change from block to block according to a predefined set of rules and which can execute arbitrary machine code. The specific rules of changing state from block to block may be maintained by a virtual machine (e.g., a computer file implemented on and/or accessible by a user device, which behaves like an actual computer) for the system.

It should be noted that, while shown as a smartphone, a personal computer, and a server in FIG. 2, the user devices may be any type of computing device, including, but not limited to, a laptop computer, a tablet computer, a hand-held computer, and/or other computing equipment (e.g., a server), including "smart," wireless, wearable, and/or mobile devices. It should be noted that embodiments describing system 200 performing a blockchain operation may equally be applied to, and correspond to, an individual user device (e.g., user device 202, user device 208, and/or user device 210) performing the blockchain operation. That is, system 200 may correspond to the user devices (e.g., user device 202, user device 208, and/or user device 210) collectively or individually.

Each of the user devices may be used by the system to conduct blockchain operations and/or contribute to digital signing process based on an MPC key system. As referred to herein, "blockchain operations" may comprise any operations including and/or related to blockchains and blockchain technology. For example, blockchain operations may include conducting transactions, querying a distributed ledger, generating additional blocks for a blockchain, transmitting communications-related nonfungible tokens, performing encryption/decryption, exchanging public/private keys, and/or other operations related to blockchains and blockchain technology. In some embodiments, a blockchain operation may comprise the creation, modification, detection, and/or execution of a smart contract or program stored on a blockchain. For example, a smart contract may comprise a program stored on a blockchain that is executed (e.g., automatically, without any intermediary's involvement or time loss) when one or more predetermined conditions are met. In some embodiments, a blockchain operation may comprise the creation, modification, exchange, and/or review of a token (e.g., a digital asset-specific blockchain), including a nonfungible token. A nonfungible token may comprise a token that is associated with a good, a service, a smart contract, and/or other content that may be verified by, and stored using, blockchain technology.

In some embodiments, blockchain operations may also comprise actions related to mechanisms that facilitate other blockchain operations (e.g., actions related to metering activities for blockchain operations on a given blockchain network). For example, Ethereum, which is an open-source, globally decentralized computing infrastructure that executes smart contracts, uses a blockchain to synchronize and store the system's state changes. Ethereum uses a network-specific cryptocurrency called ether to meter and constrain execution resource costs. The metering mechanism is referred to as "gas." As the system executes a smart contract, the system accounts for every blockchain operation (e.g., computation, data access, transaction, etc.). Each blockchain operation has a predetermined cost in units of gas (e.g., as determined based on a predefined set of rules for the system). When a blockchain operation triggers the execution of a smart contract, the blockchain operation may include an amount of gas that sets the upper limit of what can be consumed in running the smart contract. The system may terminate execution of the smart contract if the amount of gas consumed by computation exceeds the gas available in the blockchain operation. For example, in Ethereum, gas comprises a mechanism for allowing Turing-complete computation while limiting the resources that any smart contract and/or blockchain operation may consume.

In some embodiments, gas may be obtained as part of a blockchain operation (e.g., a purchase) using a network-specific cryptocurrency (e.g., ether in the case of Ethereum). The system may require gas (or the amount of the network-specific cryptocurrency corresponding to the required amount of gas) to be transmitted with the blockchain operation as an earmark to the blockchain operation. In some embodiments, gas that is earmarked for a blockchain operation may be refunded back to the originator of the blockchain operation if, after the computation is executed, an amount remains unused.

As shown in FIG. 2, one or more user devices may include a digital wallet (e.g., digital wallet 204) used to perform blockchain operations. For example, the digital wallet may comprise a repository that allows users to store, manage, and trade their cryptocurrencies and assets, interact with blockchains, and/or conduct blockchain operations using one or more applications. The digital wallet may be specific to a given blockchain protocol or may provide access to multiple blockchain protocols. In some embodiments, the system may use various types of wallets such as hot wallets and cold wallets. Hot wallets are connected to the internet while cold wallets are not. Most digital wallet holders hold both a hot wallet and a cold wallet. Hot wallets are most often used to perform blockchain operations, while a cold wallet is generally used for managing a user account and may have no connection to the internet.

As shown in FIG. 2, one or more user devices may include a private key (e.g., key 212) and/or digital signature. For example, system 200 may use cryptographic systems for conducting blockchain operations based on MPC key systems. For example, system 200 may use public-key cryptography, which features a pair of digital keys (e.g., which may comprise strings of data). In such cases, each pair comprises a public key (e.g., which may be public) and a private key (e.g., which may be kept private). System 200 may generate the key pairs using cryptographic algorithms (e.g., featuring one-way functions). System 200 may then encrypt a message (or other blockchain operation) using an intended receiver's public key such that the encrypted message may be decrypted only with the receiver's corresponding private key. In some embodiments, system 200 may combine a message with a private key to create a digital signature on the message. For example, the digital signature may be used to verify the authenticity of blockchain operations. As an illustration, when conducting blockchain operations, system 200 may use the digital signature to prove to every node in the system that it is authorized to conduct the blockchain operations.

For example, system 200 may comprise a plurality of nodes for the blockchain network. Each node may correspond to a user device (e.g., user device 208). A node for a blockchain network may comprise an application or other software that records and/or monitors peer connections to other nodes and/or miners for the blockchain network. For example, a miner comprises a node in a blockchain network that facilitates blockchain operations by verifying blockchain operations on the blockchain, adding new blocks to the existing chain, and/or ensuring that these additions are accurate. The nodes may continually record the state of the blockchain and respond to remote procedure requests for information about the blockchain.

For example, user device 208 may request a blockchain operation (e.g., conduct a transaction). The blockchain operation may be authenticated by user device 208 and/or another node (e.g., a user device in the community network of system 200). For example, using cryptographic keys, system 200 may identify users and give access to their respective user accounts (e.g., corresponding digital wallets) within system 200. Using private keys (e.g., known only to the respective users) and public keys (e.g., known to the community network), system 200 may create digital signatures to authenticate the users.

Following an authentication of the blockchain operation (e.g., using key 212), the blockchain operation may be authorized. For example, after the blockchain operation is authenticated between the users, system 200 may authorize the blockchain operation prior to adding it to the blockchain. System 200 may add the blockchain operation to blockchain 206. System 200 may perform this based on a consensus of the user devices within system 200. For example, system 200 may rely on a majority (or other metric) of the nodes in the community network (e.g., user device 202, user device 208, and/or user device 210) to determine that the blockchain operation is valid. In response to validation of the block, a node user device (e.g., user device 202, user device 208, and/or user device 210) in the community network (e.g., a miner) may receive a reward (e.g., in a given cryptocurrency) as an incentive for validating the block.

To validate the blockchain operation, system 200 may use one or more validation protocols and/or validation mechanisms. For example, system 200 may use a proof-of-work mechanism in which a user device must provide evidence that it performed computational work to validate a blockchain operation and thus this mechanism provides a manner for achieving consensus in a decentralized manner as well as preventing fraudulent validations. For example, the proof-of-work mechanism may involve iterations of a hashing algorithm. The user device that is successful aggregates and records blockchain operations from a mempool (e.g., a collection of all valid blockchain operations waiting to be confirmed by the blockchain network) into the next block. Alternatively or additionally, system 200 may use a proof-of-stake mechanism in which a user account (e.g., corresponding to a node on the blockchain network) is required to have, or "stake," a predetermined amount of tokens in order for system 200 to recognize it as a validator in the blockchain network.

In response to validation of the block, the block is added to blockchain 206, and the blockchain operation is completed. For example, to add the blockchain operation to blockchain 206, the successful node (e.g., the successful miner) encapsulates the blockchain operation in a new block before transmitting the block throughout system 200.

In some embodiments, FIG. 2 may represent a series of components and/or interactions between user devices in a multi-party computation key system. For example, user device 202 may initiate a blockchain operation using a multi-party computation key system. For example, user device 202 may send a signing request to a system coordinator (e.g., user device 210). In this embodiment, user device 210, acting as the system coordinator, may maintain custodial access of one or more private keys (or partial private keys in an MPC key system utilizing partial private keys) for the MPC key system. For example, the system coordinator may act as a remote server (or a network of computing devices) that hosts a custodial platform for blockchain operations (e.g., as further described in FIG. 4 below).

User device 202 may transmit a signing request to user device 210. The signature request may be based on a private key owner (e.g., keychain) requesting a digital signature algorithm (e.g., Elliptic Curve Digital Signature Algorithm ("ECDSA") or a threshold-based ECDSA) from the coordinator. Once signature production completes, user device 210 may transmit a valid ECDSA signature back to user device 202. To do so, the system (e.g., user device 210) may coordinate with other user devices in the MPC key system. For example, user device 210 may forward messages (e.g., based on the initial signing request) to various other user devices in the MPC key system. Each forwarded message may request in round data being returned from the other user devices that comprises a message with each user device's contribution to the key-signing process. Each user device (e.g., a cosigner to the requested blockchain operation) thus communicates with the centralized communicator (e.g., user device 210) to facilitate the MPC key-signing ceremony and cause the blockchain operation to be completed based on the signing request.

In some embodiments, the coordinator may receive signing requests from a user API and broadcast messages from cosigners to other cosigners. In such cases, the coordinator may only know that a signing operation is pending. Specifically, the coordinator may determine what signature is expected, what threshold (if any) is needed to complete the operation, other signing criteria based on a signing policy (e.g., how long to wait for cosigners to indicate participation), and/or cosigner information (e.g., address identifications) for requesting cosigners participation until the threshold is reached. The coordinator may also determine whether a signing operation is in progress. For example, the coordinator may store and forward messages that cosigners send to each other and know who the message is for (but not its contents). The coordinator may also determine whether a signing operation has completed (e.g., whether the completed signature is returned to the user API).

In contrast, cosigners (e.g., user devices) may indicate willingness to participate in a signing operation. Once conscripted by the coordinator, the cosigner receives the key material and the message to be signed from the coordinator for that operation. Cosigners may store a signing state (e.g., a tECDSA requires storing computations between rounds and which round to compute next), a secure broadcast channel state (e.g., comprising channel hashes and encryption keys), and/or the identity (and/or addresses) of other cosigners.

The system may use an Integrated Encryption scheme (e.g., ECIES) to encrypt bundles for each cosigner. Each cosigner receives, from the system, the public parameters (ECDSA public key, ECDSA public shares, proof parameters, Paillier encryption keys) and their own ECDSA secret key share and Paillier decryption key.

To perform blockchain operations in the MPC key system, the system may use three phases (e.g., key generation, conscription, and signing). The system may first enable key generation (e.g., as described in FIGS. 1A-C). For conscription, the system may use a threshold digital signing algorithm (e.g., tECDSA) that requires a given number of signers (and in some embodiments the same signers) to participate in all rounds of the protocol. By doing so, the system may register the participating cosigners and establish a secure (e.g., group messaging) channel between them. Eligible cosigners may indicate their eligibility to the coordinator for signing operations in response to queries from the coordinator.

To ensure forward secrecy, as cosigners are conscripted to participate, the system may require each cosigner to post an ephemeral public key to the coordinator (e.g., a remote server hosting a custodial platform for blockchain operations). Once all cosigners have been conscripted, each cosigner may generate a random 32 byte value and encrypt it for each of the other cosigners before transmitting. These values are used for initial group input key material and for pubkey encryption in round two of a signing process. Once the coordinator has conscripted the required number of signers to complete a signing operation, those signers are locked in and no other signers may participate in generating a particular signature. These participants are the cosigners. Cosigners are given each other's encrypted ephemeral public keys from which the group encryption key is derived.

After a cosigner computes a round, the output from the cosigner is encrypted and sent to the coordinator. The coordinator may wait to receive the broadcast outputs from all the signer rounds. After receiving all broadcast values, the coordinator may forward the broadcast values from all cosigners. For example, if three cosigners are participating, cosigner one would receive messages from cosigners two and three. Cosigner two would receive messages from one and three. Cosigner three would receive messages from one and two. In additionally broadcasting signing rounds, a cosigner may also transmit abort messages that are sent to the coordinator if signing proof verification fails or a message fails to decrypt. The coordinator then forwards the abort to all cosigners who promptly perform a secure memory wipe. The abort messages need not be encrypted. Aborts can help to detect a malicious cosigner or other abnormal activity. Additionally, rounds 1, 3, 4, 5, 6 may use the group key encryption with AES 128 GCM, while round 2 may use end-to-end encryption rather than the broadcast encryption used by the other rounds.

Figure 3:
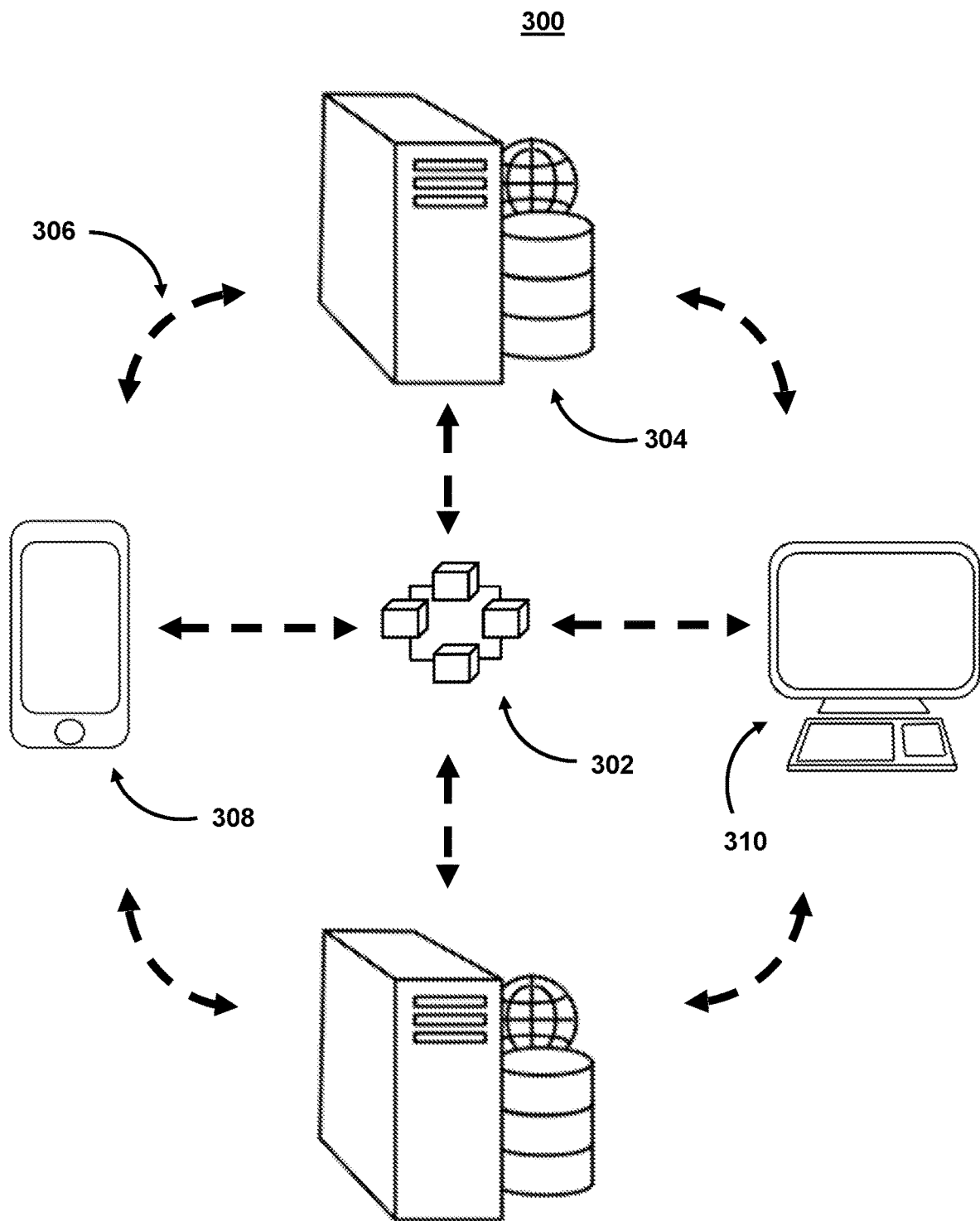
FIG. 3 shows an illustrative diagram for a decentralized application, in accordance with one or more embodiments.

FIG. 3 shows an illustrative diagram for a decentralized application, in accordance with one or more embodiments. For example, in some embodiments, system 300 may use an MPC key system within a decentralized application environment. A decentralized application may comprise an application that exists on a blockchain (e.g., blockchain 302) and/or a peer-to-peer network (e.g., network 306). That is, a decentralized application may comprise an application that has a back end that is in part powered by a decentralized peer-to-peer network such as a decentralized, open-source blockchain with smart contract functionality.

For example, network 306 may allow user devices (e.g., user device 304) within network 306 to share files and access. In particular, the peer-to-peer architecture of network 306 allows blockchain operations (e.g., corresponding to blockchain 302) to be conducted between the user devices in the network, without the need of any intermediaries or central authorities.

In some embodiments, the user devices of system 300 may comprise one or more cloud components. For example, cloud components may be implemented as a cloud computing system and may feature one or more component devices. It should also be noted that system 300 is not limited to four devices. Users may, for instance, utilize one or more devices to interact with one another, one or more servers, or other components of system 300. It should be further noted that while one or more operations (e.g., blockchain operations) are described herein as being performed by a particular component (e.g., user device 304) of system 300, those operations may, in some embodiments, be performed by other components of system 300. As an example, while one or more operations are described herein as being performed by components of user device 304, those operations may, in some embodiments, be performed by one or more cloud components. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components (e.g., user device 304 and user device 308, respectively). Additionally, or alternatively, a single user (and/or a user account linked to a single user) may interact with system 300 and/or one or more components of system 300 using two different components (e.g., user device 304 and user device 308, respectively).

With respect to the components of system 300, each of these devices may receive content and data via input/output (hereinafter "I/O") paths using I/O circuitry. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both user device 308 and user device 310 include a display upon which to display data (e.g., content related to one or more blockchain operations). Additionally, the devices in system 300 may run an application (or another suitable program). The application may cause the processors and/or control circuitry to perform operations related to the use of an MPC key system within a decentralized application environment.

Each of these devices may also include electronic storages. The electronic storages may include non-transitory storage media that electronically stores information. The electronic storage media of the electronic storages may include one or both of (i) system storage that is provided integrally (e.g., is substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more optically readable storage media (e.g., optical disk, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes network 306, which may comprise communication paths between user devices. The communication paths may include the internet, a mobile phone network, a mobile voice or data network (e.g., a 5G or LTE network), a cable network, a public switched telephone network, or other types of communications networks or combinations of communication networks. The communication paths may separately or together include one or more communication paths, such as a satellite path, a fiber-optic path, a cable path, a path that supports internet communications (e.g., IPTV), free-space connections (e.g., for broadcast or other wireless signals), or any other suitable wired or wireless communication path or combination of such paths. The computing devices may include additional communication paths linking a plurality of hardware, software, and/or firmware components operating together. For example, the computing devices may be implemented by a cloud of computing platforms operating together as the computing devices.

Figure 4:
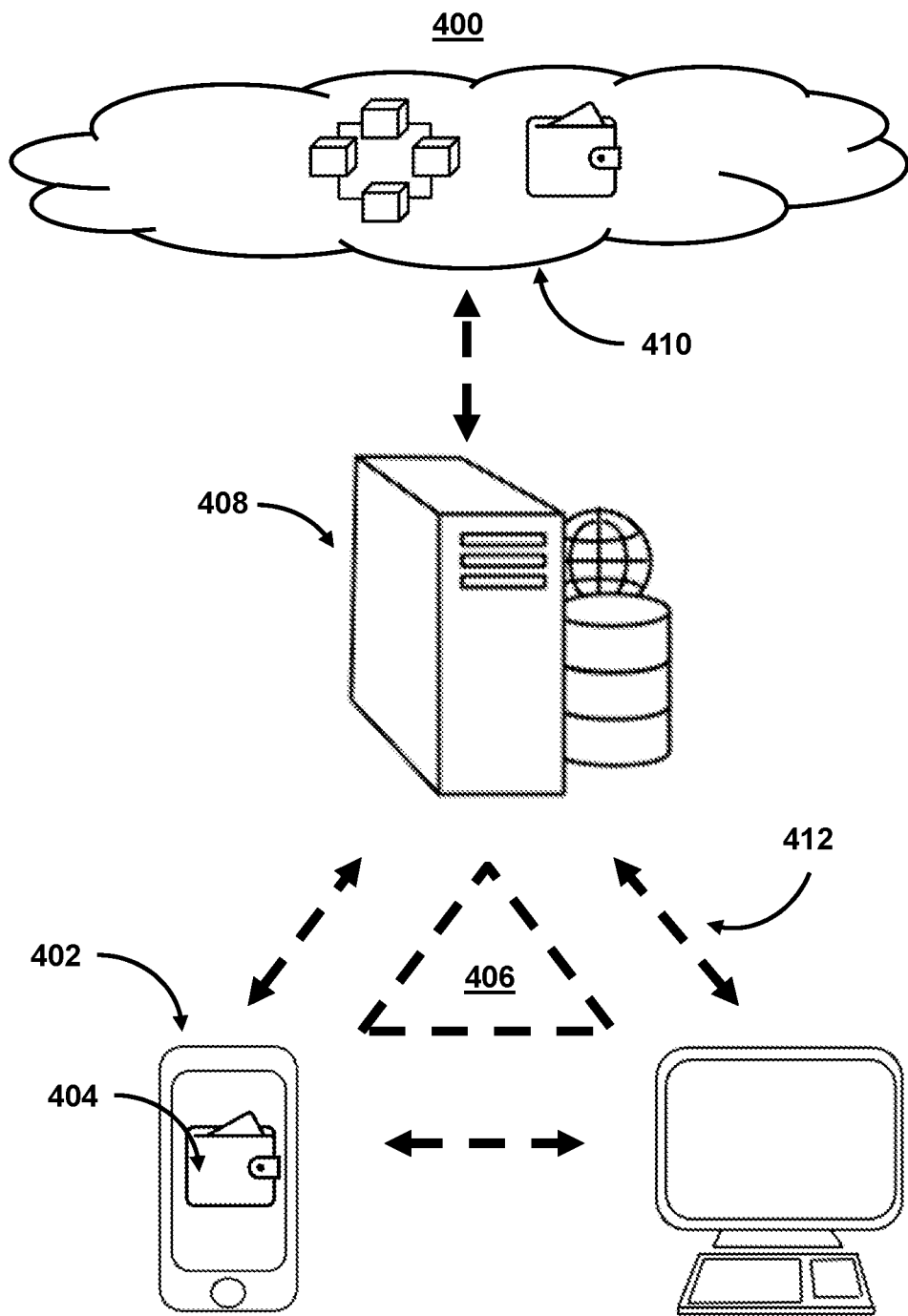
FIG. 4 shows an illustrative diagram for conducting operations in a decentralized application using blockchain operations, in accordance with one or more embodiments.

FIG. 4 shows an illustrative diagram for conducting operations in a decentralized application using blockchain operations, in accordance with one or more embodiments. For example, system 400 may include user device 402. Furthermore, user device 402 may comprise an application (e.g., application 404) that is implemented on, and/or accessible by, user device 402. For example, application 404 may interact with one or more other applications and/or application programming interfaces (APIs) in order to facilitate blockchain operations using MPC key systems. For example, application 404 may comprise a decentralized application digital wallet and/or wallet service that is able to sign and send transactions to transfer tokens and/or perform other blockchain operations as well as interact with one or more decentralized applications.

System 400 also includes API layer 406. In some embodiments, API layer 406 may be implemented on user device 402. Alternatively or additionally, API layer 406 may reside on one or more cloud components (e.g., server 408). For example, API layer 406 may reside on a server 408 and comprise a platform service for a custodial wallet service, decentralized application, etc. API layer 406 (which may be a REST or web services API layer) may provide a decoupled interface to data and/or functionality of one or more applications.

API layer 406 may provide various low-level and/or blockchain-specific operations in order to facilitate using MPC key systems. For example, API layer 406 may provide blockchain operations such as blockchain writes. Furthermore, API layer 406 may perform a transfer validation ahead of forwarding the blockchain operation (e.g., a transaction) to another service (e.g., a crypto service). API layer 406 may then log the outcome. For example, by logging to the blockchain prior to forwarding, the API layer 406 may maintain internal records and balances without relying on external verification (e.g., which may take up to 10 minutes based on blockchain updating activity).

API layer 406 may also provide informational reads. For example, API layer 406 (or a platform service powered by API layer 406) may generate blockchain operation logs and write to an additional ledger (e.g., an internal record and/or indexer service) the outcome of the reads. If this is done, a user accessing the information through other means may see consistent information such that downstream users ingest the same data point as the user.

API layer 406 may also provide a unified API to access balances, transaction histories, and/or other blockchain operations activity records between one or more decentralized applications and custodial user accounts. By doing so, the system maintains the security of sensitive information such as the balances and transaction history. Alternatively, a mechanism for maintaining such security would separate the API access between the decentralized applications and custodial user accounts through the use of special logic. The introduction of the special logic decreases the streamlining of the system, which may result in system errors based on divergence and reconciliation.

API layer 406 may provide a common, language-agnostic way of interacting with an application. In some embodiments, API layer 406 may comprise a web services API that offers a well-defined contract that describes the services in terms of their operations and the data types used to exchange information. REST APIs do not typically have this contract; instead, they are documented with client libraries for most common languages including Ruby, Java, PHP, and JavaScript. SOAP web services have traditionally been adopted in the enterprise for publishing internal services as well as for exchanging information with partners in business-to-business (B2B) transactions.

API layer 406 may use various architectural arrangements. For example, system 400 may be partially based on API layer 406, such that there is strong adoption of SOAP and RESTful web services, using resources such as Service Repository and Developer Portal, but with low governance, standardization, and separation of concerns. Alternatively, system 400 may be fully based on API layer 406, such that separation of concerns between layers such as API layer 406, services, and applications are in place.

In some embodiments, the system architecture may use a microservice approach. Such systems may use two types of layers: front-end layers and back-end layers, where microservices reside. In this kind of architecture, the role of the API layer 406 may be to provide integration between front-end and back-end layers. In such cases, API layer 406 may use RESTful APIs (exposition to front-end or even communication between microservices). API layer 406 may use the Advanced Message Queuing Protocol (AMQP), which is an open standard for passing business messages between applications or organizations. API layer 406 may use an open-source, high-performance remote procedure call (RPC) framework that may run in a decentralized application environment. In some embodiments, the system architecture may use an open API approach. In such cases, API layer 406 may use commercial or open-source API platforms and their modules. API layer 406 may use a developer portal. API layer 406 may use strong security constraints applying a web application firewall that protects the decentralized applications and/or API layer 406 against common web exploits, bots, and denial-of-service (e.g., DDoS) attacks. API layer 406 may use RESTful APIs as standard for external integration.

As shown in FIG. 4, system 400 may use API layer 406 to communicate with and/or facilitate blockchain operations with server 408. For example, server 408 may represent a custodial platform for blockchain operations. A custodial platform may manage private keys stored by a centralized service provider (e.g., server 408). In such cases, server 408 may interact with blockchain 410, a wallet service for blockchain 410, an indexer service for blockchain 410 (e.g., as described in FIG. 5), and/or other platform services.

For example, a wallet service may comprise an application and/or a software-based system that securely stores users' payment information, private keys, and/or passwords facilitating blockchain operations with websites, nodes, and/ or other devices. In some embodiments, a wallet service may also provide additional ledger access (e.g., a second ledger). Furthermore, as discussed above, this second ledger may receive updates directly from API layer 406, as opposed to relying on data pulled directly from blockchain 410.

For example, system 400 may maintain its records (e.g., both live and for accounting) in good order separate from balances on blockchain 410. That is, system 400 may maintain an architecture featuring the second ledger, where balances are stored and updated, and the logs of blockchain operations. While conventional systems may rely on directly referencing blockchain 410, since the blockchain is the source of truth for the system, however, such reliance leads to additional technical problems.

First, there is a strong likelihood of impedance mismatch between a format for a platform service and the APIs used to retrieve data from the blockchain (e.g., which may lead to accounting imbalances). For example, system 400 may need to be able to generate accounting entries reflecting changes of balances. However, while changes of balances can be tracked by examining blockchain 410, this requires additional processing and computational power.

Second, accounting changes in a blockchain architecture should be irreversible. This is achieved in practice for current blockchain operations by waiting for a variable number of confirmations from the blockchain (e.g., blockchain 410). By waiting for the variable number of confirmations, the likelihood of an error in the blockchain becomes infinitesimally small. However, while blockchain services rely on this methodology, this is not a rule inherent to the blockchain itself. That is, the blockchain does not have an inherent authentication mechanism that is dependent on a number of confirmations. Instead, the blockchain relies on an absolute system— blockchain operations are either recorded on a particular node or they are not.

As such, forks in the blockchain are always possible. In the case of a fork, system 400 may not follow the "right" fork for an undetermined amount of time. If that happens, and if, for the purpose of a custodial digital wallet, system 400 decides to move from one fork to another, system 400 may have a more straightforward mechanism to maintain an accurate history of a user account's positions if system 400 stores them independently from a given blockchain. Furthermore, in case of forks, system 400 performs some internal remediation on user accounts, which is enabled by system 400 maintaining a layer of insultation, from the blockchain, for remedial blockchain operations. For example, system 400 may have a separate storage, protected by the second ledger (e.g., a ledger service) for reads and by a transfer service for writes, that reflects the state of the blockchain that is relevant for system 400's purposes.

In some embodiments, the system may also use one or more Application Binary Interfaces (ABIs). An ABI is an interface between two program modules, often between operating systems and user programs. ABIs may be specific to a blockchain protocol. For example, an Ethereum Virtual Machine (EVM) is a core component of the Ethereum network, and a smart contract may be a piece of code stored on the Ethereum blockchain, which is executed on EVM. Smart contracts written in high-level languages like Solidity or Vyper may be compiled in EVM executable bytecode by the system. Upon deployment of the smart contract, the bytecode is stored on the blockchain and is associated with an address. To access functions defined in high-level languages, the system translates names and arguments into byte representations for byte code to work with it. To interpret the bytes sent in response, the system converts back to the tuple (e.g., a finite ordered list of elements) of return values defined in higher-level languages. Languages that compile for the EVM maintain strict conventions about these conversions, but in order to perform them, the system must maintain the precise names and types associated with the operations. The ABI documents these names and types precisely, and in an easily parseable format, making translations between human-intended method calls and smart-contract operations discoverable and reliable.

For example, ABI defines the methods and structures used to interact with the binary contract similar to an API, but on a lower-level. The ABI indicates the caller of the function to encode (e.g., ABI encoding) the needed information like function signatures and variable declarations in a format that the EVM can understand to call that function in bytecode. ABI encoding may be automated by the system using compilers or wallets interacting with the blockchain.

Figure 5:
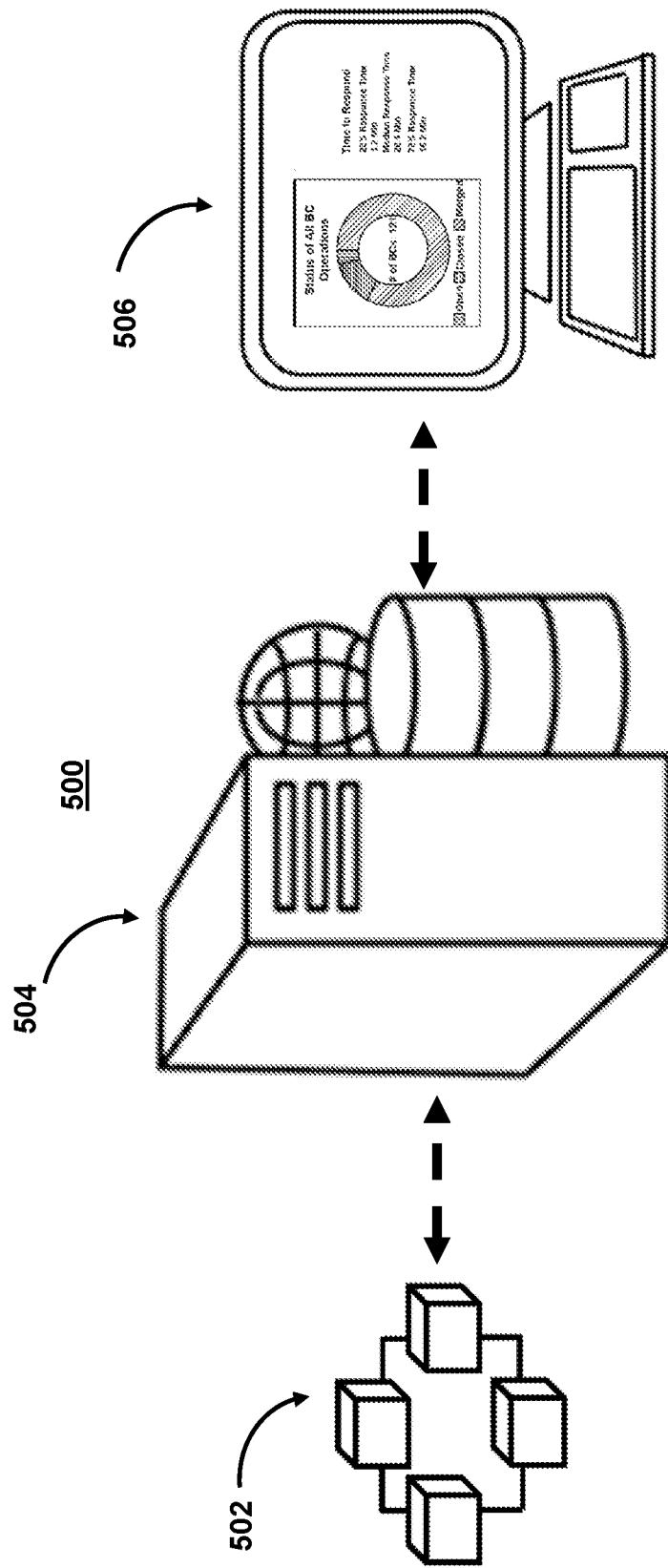
FIG. 5 shows an illustrative diagram for a blockchain indexer, in accordance with one or more embodiments.

FIG. 5 shows an illustrative diagram for a blockchain indexer, in accordance with one or more embodiments. For example, in some embodiments, the system may use indexer service 500 in conjunction with an MPC key system. Indexer service 500 may fetch raw data (e.g., data related to a current state and/or instance of blockchain 502) from a node of a blockchain network (e.g., as described above). Indexer service 500 may then process the data and store it in a database and/or data structure in an efficient way to provide quick access to the data. For example, indexer 504 may publish and/or record a subset of blockchain operations that occur for blockchain 502. Accordingly, for subsequent blockchain operations, indexer service 500 may reference the index at indexer 504 as opposed to a node of blockchain 502 to provide various services at user device 506.

For example, indexer 504 may store a predetermined list of blockchain operations to monitor for and/or record in an index. These may include blockchain operations (e.g., "operation included," "operation removed," "operation finalized") related to a given type of blockchain operation (e.g., "transaction," "external transfer," "internal transfer," "new contract metadata," "ownership change," etc.) as well as blockchain operations related to a given protocol, protocol subgroup, and/or other characteristic (e.g., "ETH," "ERC20," and/or "ERC721"). Additionally and/or alternatively, the various blockchain operations and metadata related to those blockchain operations (e.g., block designations, user accounts, time stamps, etc.) as well as an aggregate of multiple blockchain operations (e.g., total blockchain operations amounts, rates of blockchain operations, rate of blockchain updates, etc.) may be monitored and/or recorded.

Indexer 504 may likewise provide navigation and search features (e.g., support Boolean operations) for the indexed blockchain operations. In some embodiments, indexer 504 may apply one or more formatting protocols to generate representations of indexed blockchain operations in a human-readable format. In some embodiments, indexer 504 may also tag blockchain operations based on whether or not the blockchain operation originated for a local user account (e.g., a user account corresponding to a custodial account) and/or a locally hosted digital wallet. Indexer service 500 may determine whether a blockchain operation contains relevant information for users of indexer service 500 by storing information about whether an address is an internal address of indexer service 500 or one used in a digital wallet hosted by a predetermined wallet service.

Figure 6:
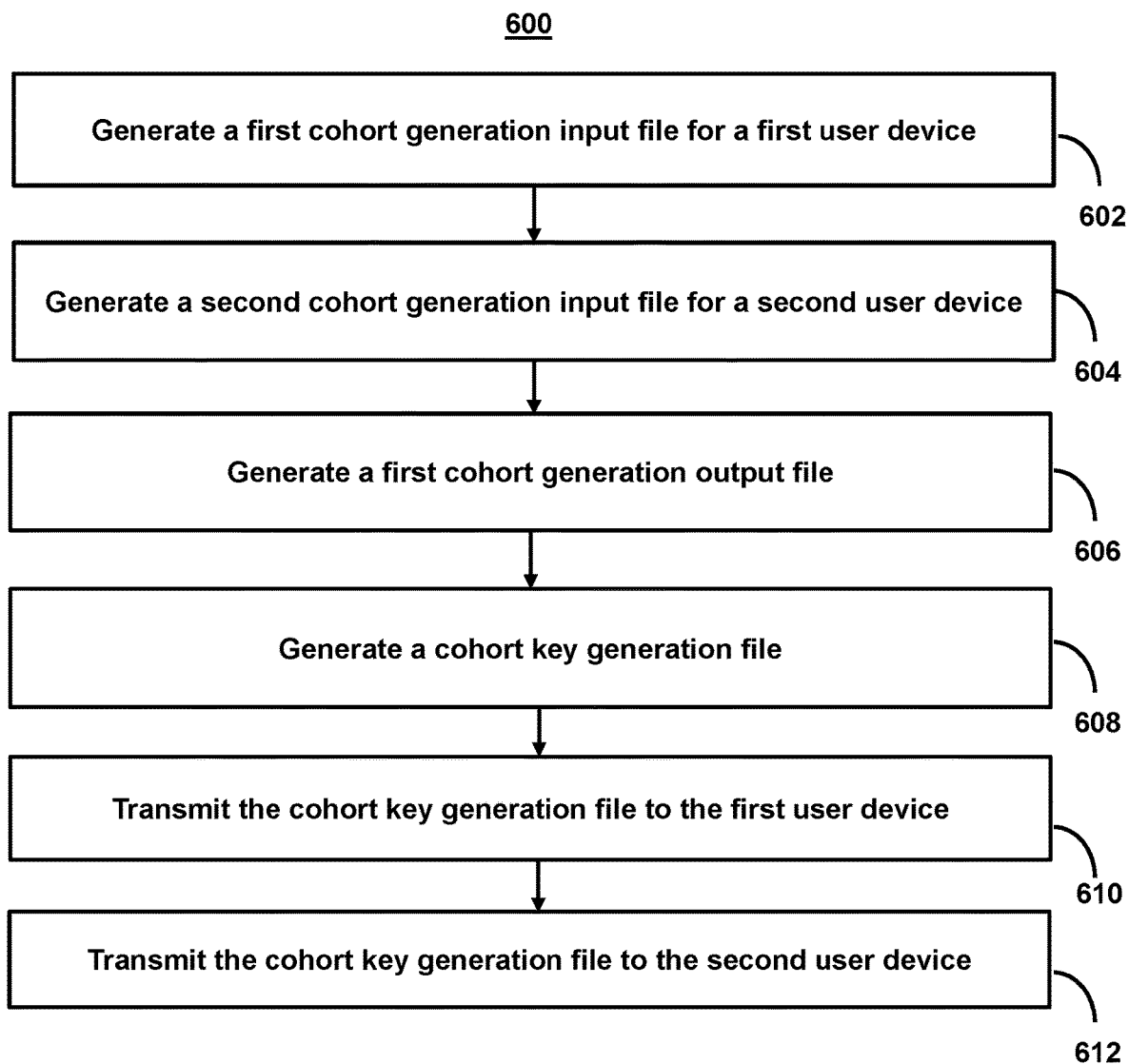
FIG. 6 shows a flowchart of the steps involved in generating secure, encrypted communications across distributed computer networks for authorizing use of cryptography-based digital repositories in order to perform blockchain operations in decentralized applications, in accordance with one or more embodiments.

FIG. 6 shows a flowchart of the steps involved for generating secure, encrypted communications across distributed computer networks for authorizing use of cryptography-based digital repositories in order to perform blockchain operations in decentralized applications, in accordance with one or more embodiments. For example, the system may use process 600 (e.g., as implemented on one or more system components described above) in order to allow a user to conduct blockchain operations in a secure manner with third-party decentralized applications.

At step 602, process 600 (e.g., using one or more components described above) may generate a first cogen input file. For example, the system may generate, for a first user device of a plurality of user devices, a first cogen input file. The first cogen input file may be based on a public portion of a first device encryption key pair and a public portion of a first device authentication key pair. The first device encryption key pair may comprise a first device encryption public key and a first device encryption private key. The first device authentication key pair may comprise a first device authentication public key and a first device authentication private key, where the first device authentication public key and the first device authentication public key are added to the first cogen input file. The first device encryption private key and the first device authentication private key may be stored only on the first user device. In some embodiments, a cloud-based hardware security module may generate the first cogen input file.

For example, a user device may comprise cosigner authorization. The cosigner authorization may correspond to a participant holding a partial key share that engages in multi-party digital signature production (e.g., an MPC key system) on behalf of the cohort. A cohort may comprise a group of user devices (or cosigners) that are linked to a common user account or digital wallet. For example, a cohort may comprise a collection of cosigners and their associated public keys. It should be noted that in some embodiments, a cohort may comprise only a single device (e.g., a single-device account), which is a use case where there is possibly only one client (e.g., user device or cosigner device) and may exclude the server-based cosigner. This use case may be represented by a mobile app installed on a single mobile phone. A single-device account is in contrast to a use case where there is guaranteed to be a sufficiently large number of client cosigner devices to ensure redundancy. For example, a typically cohort may have no less than 10 distinct clients (e.g., user devices) enrolled to participate in blockchain operations (e.g., transaction approval and signing).

At step 604, process 600 (e.g., using one or more components described above) may generate a second cogen input file for a second user device. For example, the system may generate, for a second user device of a plurality of user devices, a second cogen input file. The second cogen input file may be based on a public portion of a second device encryption key pair and a public portion of a second device authentication key pair. In some embodiments, the cloud-based hardware security module may generate the second cogen input file.

At step 606, process 600 (e.g., using one or more components described above) may generate a first cogen output file. For example, the system may generate, based on the first cogen input file and the second cogen input file, a first cogen output file. In some embodiments, the cloud-based hardware security module may generate the first cogen output file.

In some embodiments, generating the first cogen output file may further comprise selecting user devices for a cohort bloc. For example, the system may select the first user device and the second user device for a first cohort bloc. For example, the system may group one or more devices into a "bloc." As referred to herein, a bloc may comprise a group of devices (e.g., a subset of a cohort) that have redundant partial key material. The system may then, in response to selecting the first user device and the second user device for the first cohort bloc, retrieve the first device encryption public key and a second device encryption public key. The system may then use the first device encryption public key and the second device encryption public key to encrypt a bloc decryption key for the first cohort bloc.

In some embodiments, generating the first cogen output file may further comprise generating a Paillier encryption key pair. For example, the system may determine a subset of the plurality of user devices for inclusion in a first cohort bloc. The system may then generate a bloc encryption key pair for the first cohort bloc. The bloc encryption key pair for the first cohort block may comprise a bloc encryption key and a bloc decryption key. The system may then generate a Paillier encryption key pair for the first cohort bloc. The Paillier encryption key pair for the first cohort bloc may comprise a Paillier encryption key and a Paillier decryption key.

In some embodiments, generating the first cogen output file may further comprise generating a Paillier decryption key ciphertext. For example, the system may use the bloc encryption key to encrypt the Paillier decryption key. The system may then generate a Paillier decryption key ciphertext for inclusion in the first cogen output file. Alternatively, the system may use any asymmetric algorithm for public key cryptography.

In some embodiments, the first cogen output file may comprise a bloc encryption key, a Paillier encryption key, a Paillier decryption key ciphertext, a bloc decryption key ciphertext, the public portion of the first device authentication key pair, and the public portion of the second device authentication key pair.

At step 608, process 600 (e.g., using one or more components described above) may generate a cohort key generation file. For example, the system may generate a cohort key generation file, and the first cogen output file may be used to encrypt the cohort key generation file. In some embodiments, the cohort key generation file may be generated by the cloud-based hardware security module.

In some embodiments, generating the cohort key generation file may comprise generating a public key and a private key. For example, the system may generate a threshold digital signature algorithm public key. The system may then generate a threshold digital signature algorithm private key.

At step 610, process 600 (e.g., using one or more components described above) may transmit the cohort key generation file to the first user device. For example, the system may transmit, to the first user device, the cohort key generation file. The cohort key generation file may comprise a cohort public key for a digital signature algorithm and may cause a first partial private key for the digital signature algorithm to be generated on the first user device. In some embodiments, the cloud-based hardware security module may transmit the cohort key generation file to the first user device. Additionally, in some embodiments, the first user device may be configured to store the first partial private key for the digital signature algorithm.

At step 612, process 600 (e.g., using one or more components described above) may transmit the cohort key generation file to the second user device. For example, the system may transmit, to the second user device, the cohort key generation file. The cohort key generation file may comprise the cohort public key and may cause a second partial private key for the digital signature algorithm to be generated on the second user device. In some embodiments, the cloud-based hardware security module may transmit the cohort key generation file to the second user device. In some embodiments, the second user device may be configured to store the second partial private key for the digital signature algorithm.

In some embodiments, a second cogen output file may be generated. For example, the system may generate, for a third user device, a third cogen input file. The third cogen input file may be based on a third device encryption key pair and a third device authentication key pair. The system may then generate, for a fourth user device, a fourth cogen input file. The fourth cogen input file may be based on a public portion of a fourth device encryption key pair and a public portion of a fourth device authentication key pair. The system may then generate, based on the third cogen input file and the fourth cogen input file, a second cogen output file. The cohort key generation file may further be based on the second cogen output file. In some embodiments, the cloud-based hardware security module may generate the third cogen input file, the fourth cogen input file, and the second cogen output file.

In some embodiments, the cohort key generation file may be transmitted to the third and fourth user devices. For example, the system may transmit, to the third user device, the cohort key generation file. The cohort key generation file may comprise the cohort public key and may cause a third partial private key for the digital signature algorithm to be generated on the third user device. The system may then transmit, to the fourth user device, the cohort key generation file. The cohort key generation file may comprise the cohort public key and may cause a fourth partial private key for the digital signature algorithm to be generated on the fourth user device. In some embodiments, the cloud-based hardware security module may transmit the cohort key generation file to the third user device and the fourth user device. Additionally, in some embodiments, the third user device and the fourth user device may each be configured to store the third partial private key and the fourth partial private key, respectively, for the digital signature algorithm.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 6.

Figure 7:
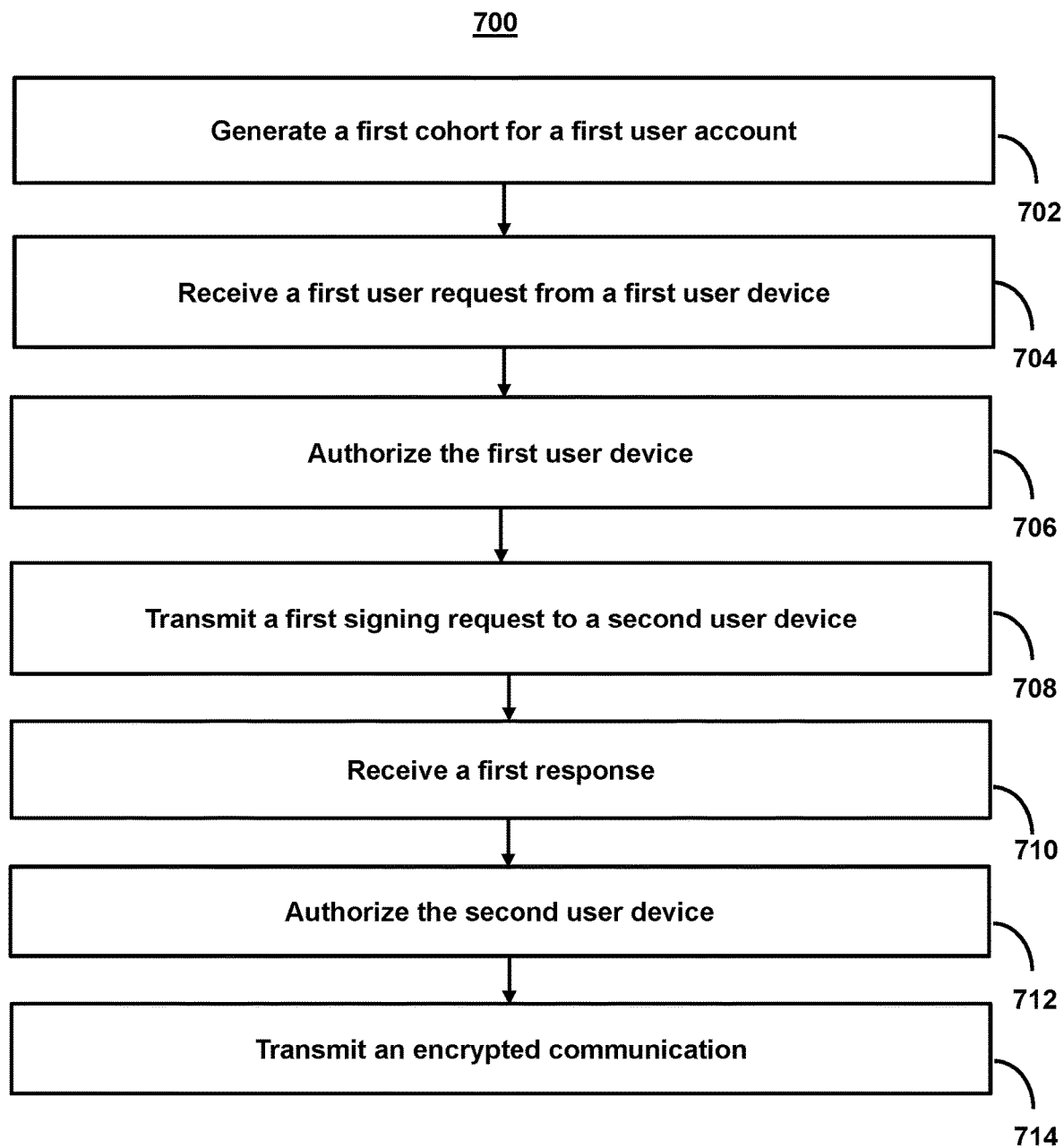
FIG. 7 shows a flowchart of the steps involved in requesting secure, encrypted communications across distributed computer networks for authorizing use of cryptography-based digital repositories in order to perform blockchain operations in decentralized applications, in accordance with one or more embodiments.

FIG. 7 shows a flowchart of the steps involved in requesting secure, encrypted communications across distributed computer networks for authorizing use of cryptography-based digital repositories in order to perform blockchain operations in decentralized applications, in accordance with one or more embodiments. For example, the system may use process 700 (e.g., as implemented on one or more system components described above) in order to allow a user to conduct blockchain operations in a secure manner with third-party decentralized applications.

At step 702, process 700 (e.g., using one or more components described above) may generate a first cohort for a first user account. For example, the system may generate, at a remote server, a first cohort for a first user account. The first cohort may include a plurality of user devices authorized to contribute to a digital signing process for blockchain operations corresponding to a first cryptography-based storage application for the first user account.

For example, the remote server may comprise a cloud-based hardware security module or a network enclave. A hardware security module (HSM) may be a physical tamper-resistant hardware appliance that is used to protect and safeguard cryptographic material and encryption keys. A network enclave may comprise a section of a network that is subdivided from the rest of the network. In some embodiments, the network enclave is limited to particular access and is not publicly accessible (e.g., internal accessibility may be restricted through the use of internal firewalls, VLANs, network admissions control, and VPNs). For example, the remote server may be a server-based cosigner (e.g., a high-availability cosigner that operates as an independent cosigner bloc operated by a remote team).

At step 704, process 700 (e.g., using one or more components described above) may receive a first user request from a first user device. For example, the system may receive, at the remote server from a first user device, a first user request to initiate a blockchain operation for the first cohort, and the first user request may include a first device identifier. For example, a first user (e.g., using a first user device) may request to perform a blockchain operation (e.g., a transaction). The system may contact a remote server (e.g., a sage server) to initiate the blockchain operation.

At step 706, process 700 (e.g., using one or more components described above) may authorize the first user device. For example, the system may authorize, at the remote server, the first user device based on the first device identifier. For example, the server may authorize the first user device based on the first device identifier. For instance, the system may only process a request from an approved device. By doing so, the system may improve security by eliminating denial-of-service attacks. The first device identifier may correspond to a cosigner identifier, which corresponds to a given cohort.

In some embodiments, authorizing the first user device based on the first device identifier may further comprise comparing the first device identifier to other device identifiers. For example, the system may determine a plurality of device identifiers for the first cohort. The system may then compare the first device identifier to the plurality of device identifiers.

In some embodiments, authorizing the first user device may be based on a first device authentication key pair. A first device encryption key pair may comprise a first device encryption public key and a first device encryption private key. The first device authentication key pair may comprise a first device authentication public key and a first device authentication private key. In some embodiments, the first device authentication public key and the first device authentication public key are added to a first cogen input file, and the first device encryption private key and the first device authentication private key are stored only on the first user device.

In some embodiments, authorizing the first device may be based on a two-part approval. For example, the two-part approval may require approval using a first partial private key stored at the first user device and a third partial private key accessible to the remote server where the first partial private key is not accessible to the remote server.

At step 708, process 700 (e.g., using one or more components described above) may transmit a first signing request to a second user device. For example, the system may, in response to authorizing the first user device based on the first device identifier, transmit to a second user device, a first signing request to contribute to the digital signing process for the blockchain operation. For example, in order to improve security, the system may coordinate between multiple devices to complete the digital signing process. By doing so, the system may prevent security risks associated with a single device being comprised.

At step 710, process 700 (e.g., using one or more components described above) may receive a first response. For example, the system may receive, at the remote server from the second user device, a first response to the first signing request. The first response may comprise an encrypted communication and a second device identifier. The encrypted communication may comprise a contribution to the digital signing process based on a second partial private key, and the second partial private key may be stored on the second user device.

For example, in response to receiving a request to contribute to the digital signing process, the second user device may contribute to the digital signature using a partial private key resident on the second user device. After contributing to the digital signature, the second user device may transmit an encrypted communication (e.g., featuring the digital signature with the second user device's contribution) back to the server.

At step 712, process 700 (e.g., using one or more components described above) may authorize the second user device. For example, the system may authorize, at the remote server, the second user device based on the second device identifier.

In some embodiments, authorizing the first user device may be based on a cohort configuration protocol. For example, the system may authorize the first user device based on the cohort configuration protocol. The cohort configuration protocol may comprise an update policy and a signing policy. The update policy may indicate a threshold approval metric required for updating a cohort composition of the first cohort, and the signing policy may indicate a threshold signing metric for authorizing the first user device.

For example, the cohort configuration protocol may indicate various rules and policies for a cohort. These polices may include update, approval, and/or signing policies, but also other rules. For example, a rule may include a configuration revision rule that comprises a monotonically increasing number that identifies when a policy supersedes another. The rules may also distinguish between trusted and untrusted devices and/or arrangements and apply different procedures accordingly. For example, a trusted (that is, local-to-the-cosigner or public-and-indelible) revision is required to prevent rollback attacks, presenting a previously valid configuration that has since been superseded.

The cohort configuration protocol may be stored on each user device in the cohort. For example, the user devices (e.g., cosigners) may be able to store cohort identifiers and revisions alongside device keys. In some examples, revision storage may be independent of services that publish configurations (including enrollment service or signing service) to prevent malicious server attacks.

When a device is initially enrolled in a cohort (including cohort formation), the device operator may independently verify the configuration policy. In some embodiments, device operators can physically co-locate in a conference room and inspect each other's devices and compare device-reported information. Alternatively, device operators can post their own information via screencap or re-type to a Slack channel or Jira ticket, or call and verify peer information.

Once enrolled, the device signs the configuration policy with its own signing key and escrows the approval signature with the device enrollment service. Additionally or alternatively, the device may cache the policy locally for performance. By storing this information, the system may perform numerous functions such as performing auditing, forensics, and/or maintenance operations. For example, if the device's local state is corrupted or destroyed (e.g., if an app is deleted and reinstalled), but the device keys remain sound, the device can download the configuration and its own approval and re-enter service without repeating the bootstrap phase.

As another example, the system may maintain separate signing and update policies. For example, the update (or approval) policy may be independent from the signing policy and/or may have different rules. For instance, the system may require only 3 of 10 user devices to approve a blockchain operation (e.g., a transaction), but the system may require 6 of 10 user devices to reduce the number of approvers. By doing so, the system provides flexibility. This level of built-in flexibility (e.g., changing policies) is valuable as the value of assets protected changes, the number of cosigners change, and/or the speed to transactions change (e.g., in contrast to conventional systems). This also allows for cohort policies to be updated in an online manner with the only offline work as verifications and still operate in an untrusted server model. For example, an update policy may specify the minimum requirements that must be satisfied before any user device (e.g., cosigner) will accept an updated policy revision.

In some embodiments, authorizing the second device may further comprise comparing a time period to a maximum time period. For instance, the threshold signing metric may correspond to a maximum time period within which an approval is received from at least one of the plurality of user devices to authorize the respective device. For example, the system may determine a time period corresponding to the first response to the first signing request. The system may then compare the time period to the maximum time period.

At step 714, process 700 (e.g., using one or more components described above) may transmit an encrypted communication. For example, the system may, in response to authorizing the second user device based on the second device identifier, transmit, to the first user device, the encrypted communication. In some embodiments, the remote server may transmit the encrypted communication to the first user device. The encrypted communication may be used to generate a completed digital signature using a first partial private key. The first partial private key may be stored on the first user device, and the completed digital signature may be used to perform the blockchain operation. For example, the first user device may complete the digital signing process and perform the blockchain operation.

In some embodiments, the blockchain operation may be submitted to a blockchain node. For example, the system may sign the blockchain operation with the completed digital signature. The system may then submit the blockchain operation to a blockchain node.

In some embodiments, submitting the blockchain operation to the blockchain node may further comprise determining various parameters. For example, the system may determine, based on a database lookup, an address for the second cryptography-based storage application. The system may then generate, based on a blockchain protocol, an unsigned transaction. The system may then determine a nonce value. The system may then determine a gas limit by simulating the blockchain transaction.

For example, submitting transactions and writing contract states may comprise the same operations depending on the blockchain protocol. Written contract states may also in include an encoded "data" field indicating the contract method and parameters to call, which is parsed by nodes and miners for the blockchain. For example, the system may look up a second cryptography-based storage application address in a database. The system may create an unsigned transaction out of input parameters, including: "to" address; Eth "value"; optional gas price, or a slow/standard/fast enum map to current gas prices; optional pre-encoded calldata for contract methods; a user account address (if not passed in). The system may determine the next nonce (e.g., the last known transaction's nonce+1 or number of confirmed transactions+number of pending transactions). Unless provided, the system may then determine the gas limit by simulating the transaction using eth_estimateGas. The gas limit will be the estimated gas usage+50% buffer by the system. The system may send the unsigned transaction to a digital signature signing process, along with the user_id, to create a signed transaction. Each user_id may be mapped to a unique "pool" and "private key," as part of the account creation process. The system may receive a signed transaction hash from the digital signing process. The system may send the signed transaction hash to a blockchain node (e.g., using the "eth_sendTransaction" method). Once the transaction is confirmed, the system may create a log event for publishing. The result of the transaction can then be queried (e.g., using the RPC methods getTransactionReceipt and GetTransactionByHash).

In some embodiments, a call request may be transmitted to the blockchain node. For example, the system may determine, based on a database lookup, an address for the first cryptography-based storage application. The system may then generate, based on a blockchain protocol, encoded data comprising a method name and parameter into a binary data format. The system may then transmit a call request to the blockchain node with the encoded data. The system may then parse the data related to the contract state based on a response from the call request.

For example, the system may use one or more protocol specific to a blockchain to perform blockchain operations. The system may not show the user any information about other types of smart contracts (or other blockchain operations) in the user interface. As such, the standard ABI for ERC20 and ERC721 contracts may be saved internally, and GRPC endpoints may be exposed allowing callers to ask for any of the standard ERC20 & ERC721 contract methods. Upon receiving a request, containing a user_id, contract address, method name, and method parameters, the second cryptography-based storage application may do the following, asynchronously. The system may look up a user's address in the database. The system may use Ethereum's ABI encoding to translate the method name and parameters into a binary data format. The system may send an "eth_call" JSON-RPC request to an Ethereum node with the encoded data as a parameter. The system may wait for the response from the node. The system may parse and return the resulting data.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 7.

Figure 8:
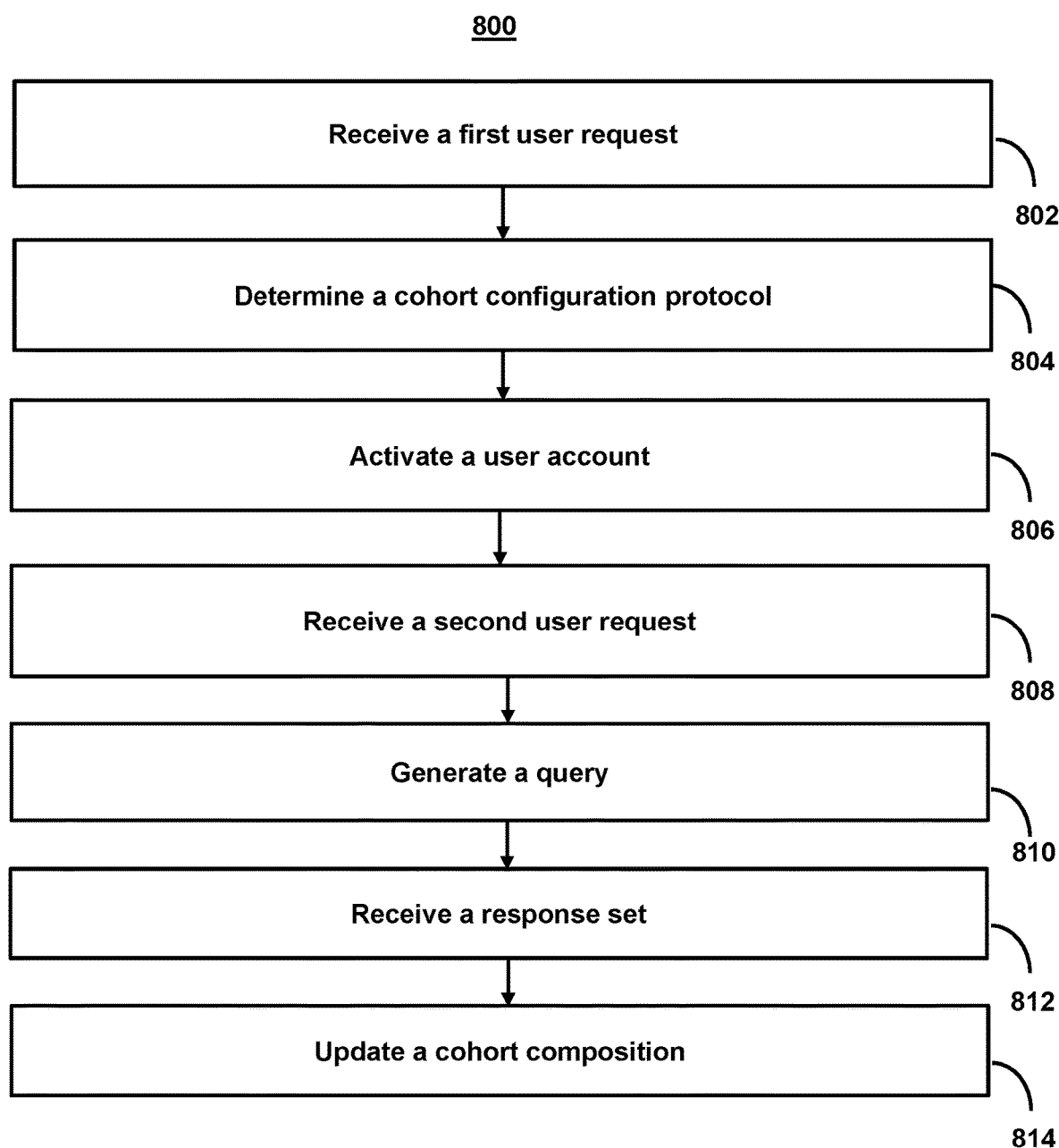
FIG. 8 shows a flowchart of the steps involved in providing secure, encrypted communications across distributed computer networks by coordinating cryptography-based digital repositories in order to perform blockchain operations in decentralized applications, in accordance with one or more embodiments.

FIG. 8 shows a flowchart of the steps involved providing secure, encrypted communications across distributed computer networks by coordinating cryptography-based digital repositories in order to perform blockchain operations in decentralized applications, in accordance with one or more embodiments. For example, the system may use process 800 (e.g., as implemented on one or more system components described above) in order to allow a user to conduct blockchain operations in a secure manner with third-party decentralized applications.

For example, conventional systems rely on multisig systems. To solve issues with multisig systems, an MPC system may be employed. However, while MPC solves issues with multisig systems it introduces new technical problems. Specifically, the use of non-portable device keys means that the initial set of cohort device signing keys cannot guarantee durability. Devices like YubiHSMs and mobile phones get lost, damaged, and may be compromised. Further, it is desirable for cohort composition to be securely adjusted over time without discarding existing signing keys. Cohorts must be able to revoke old devices, enroll new devices, and it must be possible to adjust signing policies. For example, a cohort may need to increase the number of approvals if the amount of funds on a group of addresses increases over time.

The MPC system provides built-in flexibility (changing policies) is valuable as the value of assets protected changes, the number of cosigners change, or the speed to transactions change. (Many signing systems have no such flexibility.) Cohort policies may be updated in an online manner to limit the use of cold storage the only offline work as verifications and still operate in an untrusted server model which increase speed. The system also separates the signing policy from the update policy. By doing so, new devices may be added to the cohort more easily and without risking blockchain operations.

In some embodiments, the system may comprise a cryptography-based storage application. The cryptography-based storage application may correspond to a plurality of partial private keys. The system may also comprise a plurality of user devices corresponding to a first cohort. Each of the plurality of user devices may be authorized to contribute to a digital signing process for blockchain operations corresponding to the cryptography-based storage application for a first user account. Each of the plurality of user devices may further correspond to one of the plurality of partial private keys. The system may also comprise a remote server to effectuate one or more operations as described below.

At step 802, process 800 (e.g., using one or more components described above) may receive a first user request. For example, the system may receive a first user request to generate a first cohort for a first user account. The first cohort may include a plurality of user devices authorized to contribute to a digital signing process for blockchain operations corresponding to a first cryptography-based storage application for the first user account. In some embodiments, the remote server may receive the first user request.

At step 804, process 800 (e.g., using one or more components described above) may determine a cohort configuration protocol. For example, the system may determine a first cohort configuration protocol for the first cohort. The first cohort configuration protocol may comprise an update policy, and the update policy may indicate a threshold approval metric required for updating a cohort composition of the first cohort. In some embodiments, the remote server may determine the cohort configuration protocol.

For example, the cohort configuration protocol may indicate various rules and policies for a cohort. These polices may include update, approval, and/or signing policies, but also other rules. For example, a rule may include a configuration revision rule that comprises a monotonically increasing number that identifies when a policy supersedes another. The rules may also distinguish between trusted and untrusted devices and/or arrangements and apply different procedures accordingly. For example, a trusted (that is, local-to-the-cosigner or public-and-indelible) revision is required to prevent rollback attacks, presenting a previously valid configuration that has since been superseded.

The cohort configuration protocol may be stored on each user device in the cohort. For example, the user devices (e.g., cosigners) may be able to store cohort identifiers and revisions alongside device keys. In some examples, revision storage may be independent of services that publish configurations (including enrollment service or signing service) to prevent malicious server attacks.

When a device is initially enrolled in a cohort (including cohort formation), the device operator may independently verify the configuration policy. In some embodiments, device operators can physically co-locate in a conference room and inspect each other's devices and compare device-reported information. Alternatively, device operators can post their own information via screencap or re-type to a Slack channel or Jira ticket, or call and verify peer information.

Once enrolled, the device signs the configuration policy with its own signing key and escrows the approval signature with the device enrollment service. Additionally or alternatively, the device may cache the policy locally for performance. By storing this information, the system may perform numerous functions such as performing auditing, forensics, and/or maintenance operations. For example, if the device's local state is corrupted or destroyed (e.g., if an app is deleted and reinstalled), but the device keys remain sound, the device can download the configuration and its own approval and re-enter service without repeating the bootstrap phase.

The system may also maintain separate signing and update policies. For example, the update (or approval) policy may be independent from the signing policy and/or may have different rules. For instance, the system may require only 3 of 10 user devices to approve a blockchain operation (e.g., a transaction), but the system may require 6 of 10 user devices to reduce the number of approvers. By doing so, the system provides flexibility. This level of built-in flexibility (e.g., changing policies) is valuable as the value of assets protected changes, the number of cosigners change, and/or the speed at which operations are conducted (e.g., in contrast to conventional systems). This also allows for cohort policies to be updated in an online manner with the only offline work as verifications and still operate in an untrusted server model. For example, an update policy may specify the minimum requirements that must be satisfied before any user device (e.g., cosigner) will accept an updated policy revision.

In some embodiments, the first cohort configuration protocol may further comprise a signing policy. The signing policy may indicate a threshold signing metric for authorizing the digital signing process.

For example, in contrast to conventional systems, the cohort configuration protocol may indicate a signing policy that is distinct (e.g., has different requirements and rules) from the update policy. For example, the signing policy may indicate one or more rules or protocols for generating a digital signature, such as which mathematical technique is used to validate the authenticity and integrity of a message, what software is used, or what types of digital documents (or blockchain operations) may be signed for. The update policy may indicate the rules and/or procedures for adding and/or removing user devices from a cohort.

In some embodiments, a signing policy may specify the minimum requirements that must be satisfied before any user device (e.g., cosigner) will participate in signature production. For example, the system may need to specify the minimum number of human cosigners that must approve a transaction prior to signing. This number may include both user device cosigners (e.g., humans) and server-based cosigners that will verify human cosigner approvals prior to signature production.

In some embodiments, a signing policy may include value-based policies (e.g., lower-value requirements with fewer approvers, higher-value requirements with more approvers, etc.) or external attestations such as requiring destination addresses to come from an authenticated allow list of devices (e.g., certified hot wallet addresses).

At step 806, process 800 (e.g., using one or more components described above) may activate a user account. For example, the system may activate the first user account. In some embodiments, the remote server may activate the first user account.

At step 808, process 800 (e.g., using one or more components described above) may receive a second user request. For example, the system may receive a second user request to update the cohort composition. In some embodiments, the remote server may receive the second user request.

At step 810, process 800 (e.g., using one or more components described above) may generate a query. For example, the system may, in response to receiving the second user request, generate a query to the plurality of user devices. In some embodiments, the remote server may generate the query.

At step 812, process 800 (e.g., using one or more components described above) may receive a response set. For example, the system may receive a response set to the query. The response set may comprise a respective response from at least one of the plurality of user devices. In some embodiments, the remote server may receive the response set to the query.

At step 814, process 800 (e.g., using one or more components described above) may update a cohort composition. For example, the system may update the cohort composition based on comparing the response set to the update policy. In some embodiments, the remote server may update the cohort composition.

In some embodiments, updating the cohort composition based on comparing the response set to the update policy may further comprise comparing a number of approvals. For instance, in some embodiments, the threshold approval metric may correspond to a minimum number of approvals required to be received from different user devices of the plurality of user devices to authorize the update. In other embodiments, the threshold approval metric may correspond to a minimum number of approvals required to be received from a single user device of the plurality of user device to authorize the update. As an example, the system may determine a number of approvals in the response set. The system may then compare the number of approvals to the minimum number of approvals.

For example, the system may poll the numerous devices in a cohort and require a minimum number of different devices in the cohort to approve of the update. As another example, the system may poll a single device in a cohort and require a minimum number of approvals to come from a single device. In some embodiments, the system may apply additional criteria such as requiring the approvals to come within a given time period and/or at a given frequency. In some embodiments, updating the cohort composition based on comparing the response set to the update policy may further comprise comparing a percentage of approvals. For instance, in some embodiments, the threshold approval metric may correspond to a minimum percentage of approvals required to be received from the plurality of user devices to authorize the update. For example, the system may determine a percentage of approvals in the response set. The system may then compare the percentage of approvals to the minimum percentage of approvals.

In some embodiments, updating the cohort composition based on comparing the response set to the update policy may further comprise comparing time periods. For instance, in some embodiments, the threshold approval metric may correspond to a maximum time period within which an approval is received from at least one of the plurality of user devices to authorize the update. For example, the system may determine a time period corresponding to the response set. The system may then compare the time period to the maximum time period.

In some embodiments, updating the cohort composition based on comparing the response set to the update policy may further comprise comparing frequencies. For instance, in some embodiments, the threshold approval metric may correspond to a minimum frequency for updates to the cohort composition. For example, the system may determine a current frequency for updates to the cohort composition. The system may then compare the minimum frequency to the current frequency.

In some embodiments, updating the cohort composition based on comparing the response set to the update policy may further comprise comparing wait times. For instance, in some embodiments, the threshold approval metric may correspond to a minimum wait time for updating the signing policy following the cohort update. For example, the system may determine a current wait time for updating the signing policy following the cohort update. The system may then compare the minimum wait time to the current wait time.

In some embodiments, updating the cohort composition based on comparing the response set to the update policy may further comprise determining an amount of digital assets. For instance, in some embodiments, the threshold approval metric may be based on an amount of digital assets in the first cryptography-based storage application. For example, the system may determine a current amount of digital assets in the first cryptography-based storage application. The system may then compare the current amount of digital assets to the threshold approval metric.

In some embodiments, updating the cohort composition based on comparing the response set to the update policy may further comprise determining a current network-imposed processing load. For instance, in some embodiments, the threshold approval metric may be based on a respective network-imposed processing load for a call operation to a blockchain node. For example, the system may determine a current network-imposed processing load for the call operation to the blockchain node. The system may then compare the current network-imposed processing load to the threshold approval metric.

In some embodiments, the update may comprise altering the cohort. For example, the update may comprise adding a new user device to the first cohort, removing a current user device of the plurality of user devices from the first cohort, or substituting the current user device of the plurality of user devices from the first cohort with the new user device.

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 8.

Figure 9:
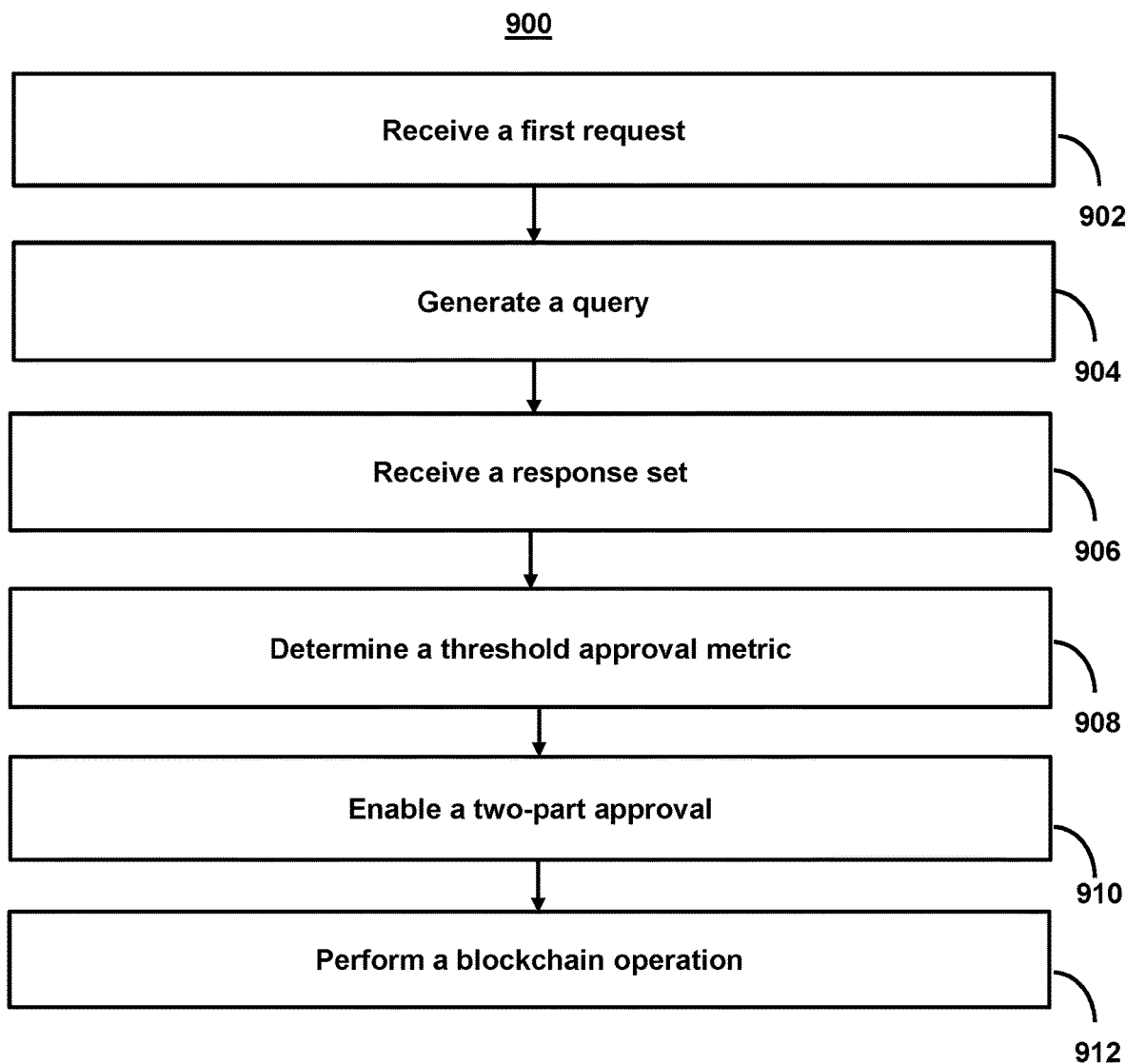
FIG. 9 shows a flowchart of the steps involved in generating secure, encrypted communications across distributed computer networks for authorizing use of cryptography-based digital repositories in order to perform blockchain operations in decentralized applications, in accordance with one or more embodiments.

FIG. 9 shows a flowchart of the steps involved generating secure, encrypted communications across distributed computer networks for authorizing use of cryptography-based digital repositories in order to perform blockchain operations in decentralized applications, in accordance with one or more embodiments. For example, the system may use process 900 (e.g., as implemented on one or more system components described above) in order to allow a user to conduct blockchain operations in a secure manner with third-party decentralized applications.

In some embodiments, the system may comprise a cryptography-based storage application. The cryptography-based storage application may correspond to a plurality of partial private keys. The system may also comprise a plurality of user devices, where each of the user devices corresponds to one of the plurality of partial private keys. The system may also comprise a remote server configured to effectuate one or more operations as described below.

At step 902, process 900 (e.g., using one or more components described above) may receive a first user request. For example, the system may receive, at a remote server from a first user device, a first request to perform a blockchain operation for a first cohort for a first user account. The first cohort may include a plurality of user devices authorized to contribute to a digital signing process for blockchain operations corresponding to a cryptography-based storage application for the first user account.

For example, the remote server may comprise a cloud-based hardware security module or a network enclave. An HSM may be a physical tamper-resistant hardware appliance that is used to protect and safeguard cryptographic material and encryption keys. A network enclave may comprise a section of a network that is subdivided from the rest of the network. In some embodiments, the network enclave is limited to particular access and is not publicly accessible (e.g., internal accessibility may be restricted through the use of internal firewalls, VLANs, network admissions control, and VPNs).

As another example, the system may use a user account that corresponds to an account for the blockchain platform service. For example, as opposed to a non-custodial cryptography-based storage application, which may correspond to a user without a third-party intermediary, the user account may correspond to a third-party intermediary (e.g., the platform service). By having a user account that corresponds to the platform service that is separate and distinct from a non-custodial cryptography-based storage application, the system may provide additional features that would not be possible with conventional blockchain operations. For example, the system may augment and/or modify blockchain operations prior to completion in order to prevent fraud, verify user intent, and/or otherwise increase security. Additionally or alternatively, by having a user account that corresponds to the platform service that is separate and distinct from a non-custodial cryptography-based storage application, the system may provide a single user to access multiple custodial cryptography-based storage applications using a single account for the platform service. In some embodiments, the first user account may correspond to a blockchain or user address. For example, a user address may correspond to a non-custodial cryptography-based storage application assigned by a blockchain. The non-custodial wallet may correspond to a private and/or public key that allows blockchain operations to be performed using funds and/or information in the non-custodial wallet.

As another example, with respect to the digital signing process, the system may query the first user device for use of its partial private key. For example, in order to maintain security, neither the first user device nor the first remote device may share their respective partial private keys. However, both devices may still be required to use their partial private keys in order to perform the blockchain operation. To accomplish this, the system may use a Schnorr signature algorithm, ECDSA, Digital Signature Algorithm (DSA), and/or other suitable algorithm. For example, the key-signing session may involve the setting of one or more parameters as well as a hash function.

For example, in one embodiment, a threshold signature scheme may generate both a secret key, s, during key generation as well as the random nonce, k, for each signing operation. In such cases, a key-signing session may require a minimum of four rounds for each signing operation (e.g., assuming no round results in an error). For example, the system may use three rounds to obtain k, and the system may use one round to distribute signature shares and compute the group signature.

For example, the key-signing session may involve the setting of one or more parameters as well as a hash function. The system may also select a nonce value. The nonce may be an arbitrary number that can be used once in a cryptographic communication. The system may determine the nonce to be a random or pseudo-random number. The nonce value may be selected by the system based on an authentication protocol to ensure that previous blockchain operations (and/or communications containing them) cannot be reused. The system may also use the nonce value to initialize vectors for a hash function. For example, the system may select a nonce value to adjust the level of difficulty (e.g., the amount of work required) in a proof-of-work system.

As yet another example, cryptography-based digital repositories or a cryptography-based storage application may refer to a digital wallet. A digital wallet may comprise a software-based system that securely (and typically in an encrypted format) stores users, confidential information, personal information, payment information, and/or passwords for numerous payment methods and websites. By using a digital wallet, users can complete communications, purchases, and/or other blockchain operations easily and securely without risking the information becoming public or subject to a cyberattack.

In some embodiments, the digital signing process may be selected. For example, the system may determine a characteristic of the first user device. The system may then select the digital signing process based on the characteristic. For instance, the system may select a digital signing process based on the processing power and/or geographic location of the first user device. For example, some devices may suffer from low processing power and/or low connectivity. As such, the system may determine a characteristic of a user device and select a signature scheme based on the characteristic. For example, the system may select a Flexible Round-Optimized Schnorr Threshold Signatures (FROST) protocol, which may use a two-round Distributed Key Generation (DKG) protocol to generate the nonce required for the signature.

At step 904, process 900 (e.g., using one or more components described above) may generate a query. For example, the system may, in response to receiving the first user request, generate a query to the plurality of user devices. In some embodiments, the remote server may generate the query to the plurality of user devices.

At step 906, process 900 (e.g., using one or more components described above) may receive a response set. For example, the system may receive a response set to the query. The response set may comprise a respective response from at least one of the plurality of user devices. In some embodiments, the remote server may receive the response set to the query.

For example, in order to provide flexibility and support dynamic cohort composition, the system may allow changes for non-portable device keys as the initial set of cohort device signing keys cannot guarantee durability. Devices like YubiHSMs and mobile phones get lost, damaged, and may be compromised. Further, it is desirable for cohort composition to be securely adjusted over time without discarding existing signing keys. Cohorts must be able to revoke old devices, enroll new devices, and it must be possible to adjust signing policies. For example, a cohort may need to increase the number of approvals if the amount of funds on a group of addresses increases over time.

In some embodiments, the response set may further comprise endorsement by at least one of the plurality of user devices of the blockchain operation using digital signatures generated using the respective partial private key of at least one of the plurality of user devices. For example, each cohort configuration may contain a signing policy (e.g., instructions for which blockchain operation) that will be approved and the number of independent endorsements from a cohort that are required to reach full approval. For example, a signing policy may indicate that all blockchain operations require a fixed number of endorsements (e.g., n>1) by user devices (e.g., corresponding to human cosigners) prior to producing a 2-party signature. The cohort policy is then endorsed by all members of the cohort via digital signatures generated using their respective cosigner authentication keys.

In some embodiments, the response set may comprise a verifiable endorsement. The first user device may verify all endorsements or verify an approval policy for the first cohort is met. For example, (n+1)-party signing with a server and n user devices is interactive in all current, secure, threshold signing algorithms. Interactive protocols are undesirable as they do not scale operationally. The system may exploit the secure cohort approval policy mechanism (cohort manager) so that the first n user devices act as an approver (e.g., the first n user devices submit a verifiable endorsement, and the final user device verifies all endorsements). The final user device may verify that the approval policy is met and participates in a two-party signing with the remote server. This process is interactive but requires only one user device and the remote server (which is always online) to be available. Therefore, this arrangement does scale operationally. Moreover, both the remote server and the user device are mutually distrusting. As such, both parties may enforce approval policy prior to participating in a two-party signing. Accordingly, the system ensures that any one malicious party cannot violate the approval policy and proceed with a signature.

In some embodiments, the response set may comprise a video confirmation received from at least one of the plurality of user devices. For example, the system may require a video confirmation of a user corresponding to a user device in order to perform a blockchain operation. For example, the system may have a signing and update policy that requires a user device-controlled quorum of approvals from the cohort bloc, but may also require one to two approval (e.g., approval by less than all cohort devices) to approve blockchain operations and updates. The one to two approval may comprise a video call and video recording review.

At step 908, process 900 (e.g., using one or more components described above) may determine a threshold approval metric. For example, the system may determine a threshold approval metric has been met based on the response set. The threshold approval metric may indicate a minimum number of approvals required to be received in response to the query. Additionally or alternatively, in some embodiments, the minimum number of approvals required to be received in response to the query may be selected based on a percentage of the plurality of user devices. In some embodiments, the remote server may determine the threshold approval metric has been met based on the response set.

For example, the system may enforce a quorum of user device (e.g., cosigner) approvals prior to a cosigner participating in a two-of-two signing protocol. By doing so, the system provides asynchronous human cosigner operations even for a normally-synchronous protocol like tECDSA as a server-based cosigner (e.g., corresponding to the remote server) is always online and acts as the second signing party. In order for this is to give the same security as a threshold (t-of-n) key share, the system (and each user device) must be able to verify that other user devices (e.g., cosigners) in the same cohort have previously approved the message to be signed (e.g., the message comprising the blockchain operation).

In some embodiments, determining that the threshold approval metric has been met may further comprise comparing a difference in time. For example, the system may determine a first time at which the query was sent. The system may then determine a current time. The system may then determine a difference between the first time and the current time. The system may then determine whether the difference meets a threshold time difference.

For example, the system may require a response time to be received within a threshold amount of time of the sending of the query. By limiting the time to respond, the system enhances security and reduces the likelihood of an unauthorized cyberattack. In some embodiments, the system may dynamically adjust the threshold time difference. For example, the system may maintain user profile information about the user account, information about current network conditions, and/or use other characteristics to set the threshold time difference.

At step 910, process 900 (e.g., using one or more components described above) may enable a two-part approval. For example, the system may, in response to the threshold approval metric being met, enable a two-part approval. The two-part approval may require approval using a first partial private key stored at the first user device and a second partial private key accessible to the remote server, where the first partial private key is not accessible to the remote server. In some embodiments, the remote server may enable the two-part approval.

For example, the system may use a trustless arrangement in which a user device's trust of a cohort configuration (including signing, approval, and/or update policy) is based on self-enrollment in that configuration. That is, a user device must verify that the initial policy, which specifies peer cosigner pubkeys and the quorums for signing and policy change thru external means (out-of-band). Revisions to a cohort configuration are trusted when the revised policy is approved either by the user device itself or a quorum of the user device's trusted peers (as specified in a previously-trusted cohort configuration). When a quorum trust is used, a user device repeats self-enrollment by endorsing the policy with its own signing key and so initial and revised configurations are verified identically.

In some embodiments, enabling the two-part approval may comprise generating a partial signature. For example, the system may retrieve, at the remote server, a second partial private key. The system may then generate a partial digital signature by contributing to the digital signing process using the second partial private key. The system may then transmit the partial digital signature to the first user device. Additionally or alternatively, in some embodiments, the two-part approval may comprise retrieving the second partial private key from a cold storage application.

At step 912, process 900 (e.g., using one or more components described above) may perform a blockchain operation. For example, the system may perform the blockchain operation following the two-part approval. In some embodiments, the remote server may perform the blockchain operation following the two-part approval. In some embodiments, performing the blockchain operation may further comprise generating a digital signature by completing the digital signing process using the first partial private key.

It is contemplated that the steps or descriptions of FIG. 9 may be used with any other embodiment of this disclosure. In addition, the steps and descriptions described in relation to FIG. 9 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 9.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

A1. A method for generating secure, encrypted communications across distributed computer networks for authorizing use of cryptography-based digital repositories in order to perform blockchain operations in decentralized applications, the method comprising: generating, for a first user device of a plurality of user devices, a first cohort generation input file, wherein the first cohort generation input file is based on a public portion of a first device encryption key pair and a public portion of a first device authentication key pair; generating, for a second user device of a plurality of user devices, a second cohort generation input file, wherein the second cohort generation input file is based on a public portion of a second device encryption key pair and a public portion of a second device authentication key pair; generating, based on the first cohort generation input file and the second cohort generation input file, a first cohort generation output file; generating a cohort key generation file, wherein the first cohort generation output file is used to encrypt the cohort key generation file; transmitting, to the first user device, the cohort key generation file, wherein the cohort key generation file comprises a cohort public key for a digital signature algorithm and causes a first partial private key for the digital signature algorithm to be generated on the first user device; and transmitting, to the second user device, the cohort key generation file, wherein the cohort key generation file comprises the cohort public key and causes a second partial private key for the digital signature algorithm to be generated on the second user device.

A2. The method of embodiment A1, further comprising: generating, for a third user device, a third cohort generation input file, wherein the third cohort generation input file is based on a third device encryption key pair and a third device authentication key pair; generating, for a fourth user device, a fourth cohort generation input file, wherein the fourth cohort generation input file is based on a public portion of a fourth device encryption key pair and a public portion of a fourth device authentication key pair; and generating, based on the third cohort generation input file and the fourth cohort generation input file, a second cohort generation output file, wherein the cohort key generation file is further based on the second cohort generation output file.

A3. The method of any of embodiments A1-A2, further comprising: transmitting, to the third user device, the cohort key generation file, wherein the cohort key generation file comprises the cohort public key and causes a third partial private key for the digital signature algorithm to be generated on the third user device; and transmitting, to the fourth user device, the cohort key generation file, wherein the cohort key generation file comprises the cohort public key and causes a fourth partial private key for the digital signature algorithm to be generated on the fourth user device.

A4. The method of any of embodiments A1-A3, wherein the first device encryption key pair comprises a first device encryption public key and a first device encryption private key, wherein the first device authentication key pair comprises a first device authentication public key and a first device authentication private key, wherein the first device encryption public key and the first device authentication public key are added to the first cohort generation input file, and wherein the first device encryption private key and the first device authentication private key are stored only on the first user device.

A5. The method of any of embodiments A1-A4, wherein generating the first cohort generation output file further comprises: selecting the first user device and the second user device for a first cohort bloc; in response to selecting the first user device and the second user device for the first cohort bloc, retrieving the first device encryption public key and a second device encryption public key; and using the first device encryption public key and the second device encryption public key to encrypt a bloc decryption key for the first cohort bloc.

A6. The method of any of embodiments A1-A5, wherein generating the first cohort generation output file further comprises: determining a subset of the plurality of user devices for inclusion in a first cohort bloc; generating a bloc encryption key pair for the first cohort bloc, wherein the bloc encryption key pair for the first cohort bloc comprises a bloc encryption key and a bloc decryption key; and generating a Paillier encryption key pair for the first cohort bloc, wherein the Paillier encryption key pair for the first cohort bloc comprises a Paillier encryption key and a Paillier decryption key.

A7. The method of any of embodiments A1-A6, wherein generating the first cohort generation output file further comprises: using the bloc encryption key to encrypt the Paillier decryption key; and generating a Paillier decryption key ciphertext for inclusion in the first cohort generation output file.

A8. The method of any of embodiments A1-A7, wherein the first cohort generation output file comprises a bloc encryption key, a Paillier encryption key, a Paillier decryption key ciphertext, a bloc decryption key ciphertext, the public portion of the first device authentication key pair, and the public portion of the second device authentication key pair.

A9. The method of any of embodiments A1-A8, wherein generating the cohort key generation file comprises: generating a threshold digital signature algorithm public key; and generating a threshold digital signature algorithm private key.

A10. The method of any of embodiments A1-A9, wherein the first cohort generation output file is based on an asymmetric algorithm for public key cryptography.

B1. A method for requesting secure, encrypted communications across distributed computer networks for authorizing use of cryptography-based digital repositories in order to perform blockchain operations in decentralized applications, the method comprising: generating, at a remote server, a first cohort for a first user account, wherein the first cohort includes a plurality of user devices authorized to contribute to a digital signing process for blockchain operations corresponding to a first cryptography-based storage application for the first user account; receiving, at the remote server from a first user device, a first user request to initiate a blockchain operation for the first cohort, wherein the first user request includes a first device identifier; authorizing, at the remote server, the first user device based on the first device identifier; in response to authorizing the first user device based on the first device identifier, transmitting, to a second user device, a first signing request to contribute to the digital signing process for the blockchain operation; receiving, at the remote server from the second user device, a first response to the first signing request, wherein the first response comprises an encrypted communication and a second device identifier, wherein the encrypted communication comprises a contribution to the digital signing process based on a second partial private key, wherein the second partial private key is stored on the second user device; authorizing, at the remote server, the second user device based on the second device identifier; and in response to authorizing the second user device based on the second device identifier, transmitting, to the first user device, the encrypted communication, wherein the encrypted communication is used to generate a completed digital signature using a first partial private key, wherein the first partial private key is stored on the first user device, and wherein the completed digital signature is used to perform the blockchain operation.

B2. The method of embodiment B1, wherein authorizing the first user device is based on a cohort configuration protocol, wherein the cohort configuration protocol comprises: an update policy, wherein the update policy indicates a threshold approval metric required for updating a cohort composition of the first cohort; and a signing policy, wherein the signing policy indicates a threshold signing metric for authorizing the first user device.

B3. The method of any of embodiments B1-B2, wherein the threshold signing metric corresponds to a maximum time period within which an approval is received from at least one of the plurality of user devices to authorize the respective device, and wherein authorizing the second user device further comprises: determining a time period corresponding to the first response to the first signing request; and comparing the time period to the maximum time period.

B4. The method of any of embodiments B1-B3, wherein authorizing the first user device based on the first device identifier further comprises: determining a plurality of device identifiers for the first cohort; comparing the first device identifier to the plurality of device identifiers.

B5. The method of any of embodiments B1-B4, further comprising: signing the blockchain operation with the completed digital signature; and submitting the blockchain operation to a blockchain node.

B6. The method of any of embodiments B1-B5, wherein submitting the blockchain operation to the blockchain node comprises: determining, based on a database lookup, an address for the second cryptography-based storage application; generating, based on a blockchain protocol, an unsigned transaction; determining a nonce value; and determining a gas limit by simulating the blockchain transaction.

B7. The method of any of embodiments B1-B6, further comprising: determining, based on a database lookup, an address for the first cryptography-based storage application; generating, based on a blockchain protocol, encoded data comprising a method name and parameter into a binary data format; transmit a call request to the blockchain node with the encoded data; and parsing the data related to the contract state based on a response from the call request.

B8. The method of any of embodiments B1-B7, wherein authorizing the first user device is further based on a first device authentication key pair, wherein the first device encryption key pair comprises a first device encryption public key and a first device encryption private key, wherein the first device authentication key pair comprises a first device authentication public key and a first device authentication private key, wherein the first device encryption public key and the first device authentication public key are added to a first cohort generation input file, and wherein the first device encryption private key and the first device authentication private key are stored only on the first user device.

B9. The method of any of embodiments B1-B8, wherein authorizing the first user device is further based a two-part approval, wherein the two-part approval requires approval using a first partial private key stored at the first user device and a third partial private key accessible to the remote server, wherein the first partial private key is not accessible to the remote server.

C1. A method for providing secure, encrypted communications across distributed computer networks by coordinating cryptography-based digital repositories in order to perform blockchain operations in decentralized applications, the method comprising: receiving a first user request to generate a first cohort for a first user account, wherein the first cohort includes a plurality of user devices authorized to contribute to a digital signing process for blockchain operations corresponding to a first cryptography-based storage application for the first user account; determining a first cohort configuration protocol for the first cohort, wherein the first cohort configuration protocol comprises an update policy, and wherein the update policy indicates a threshold approval metric required for updating a cohort composition of the first cohort; activating the first user account; receiving a second user request to update the cohort composition; in response to receiving the second user request, generating a query to the plurality of user devices; receiving a response set to the query, wherein the response set comprises a respective response from at least one of the plurality of user devices; and updating the cohort composition based on comparing the response set to the update policy.

C2. The method of embodiment C1, wherein the first cohort configuration protocol further comprises a signing policy, wherein the signing policy indicates a threshold signing metric for authorizing the digital signing process.

C3. The method of any of embodiments C1-C2, wherein the threshold approval metric corresponds to a minimum number of approvals required to be received from different user devices of the plurality of user devices to authorize the update, and wherein updating the cohort composition based on comparing the response set to the update policy further comprises: determining a number of approvals in the response set; and comparing the number of approvals to the minimum number of approvals.

C4. The method of any of embodiments C1-C3, wherein the threshold approval metric corresponds to a minimum number of approvals required to be received from a single user device of the plurality of user devices to authorize the update, and wherein updating the cohort composition based on comparing the response set to the update policy further comprises: determining a number of approvals in the response set; and comparing the number of approvals to the minimum number of approvals.

C5. The method of any of embodiments C1-C4, wherein the threshold approval metric corresponds to a minimum percentage of approvals required to be received from the plurality of user devices to authorize the update, and wherein updating the cohort composition based on comparing the response set to the update policy further comprises: determining a percentage of approvals in the response set; and comparing the percentage of approvals to the minimum percentage of approvals.

C6. The method of any of embodiments C1-05, wherein the threshold approval metric corresponds to a maximum time period within which an approval is received from at least one of the plurality of user devices to authorize the update, and wherein updating the cohort composition based on comparing the response set to the update policy further comprises: determining a time period corresponding to the response set; and comparing the time period to the maximum time period.

C7. The method of any of embodiments C1-C6, wherein the threshold approval metric corresponds to a minimum frequency for updates to the cohort composition, and wherein updating the cohort composition based on comparing the response set to the update policy further comprises: determining a current frequency for updates to the cohort composition; and comparing the minimum frequency to the current frequency.

C8. The method of any of embodiments C1-C7, wherein the threshold approval metric corresponds to a minimum wait time for updating the signing policy following the cohort update, and wherein updating the cohort composition based on comparing the response set to the update policy further comprises: determining a current wait time for updating the signing policy following the cohort update; and comparing the minimum wait time to the current wait time.

C9. The method of any of embodiments C1-C8, wherein the threshold approval metric is based on an amount of digital assets in the first cryptography-based storage application, and wherein updating the cohort composition based on comparing the response set to the update policy further comprises: determining a current amount of digital assets in the first cryptography-based storage application; and comparing the current amount of digital assets to the threshold approval metric.

C10. The method of any of embodiments C1-C9, wherein the threshold approval metric is based on a respective network-imposed processing load for a call operation to a blockchain node, and wherein updating the cohort composition based on comparing the response set to the update policy further comprises: determining a current network-imposed processing load for the call operation to the blockchain node; and comparing the current network-imposed processing load to the threshold approval metric.

C11. The method of any of embodiments C1-C10, wherein the update comprises adding a new user device to the first cohort, removing a current user device of the plurality of user devices from the first cohort, or substituting the current user device of the plurality of user devices from the first cohort with the new user device.

D1. A method for generating secure, encrypted communications across distributed computer networks for authorizing use of cryptography-based digital repositories in order to perform blockchain operations in decentralized applications, the method comprising: receiving, at a remote server from a first user device, a first request to perform a blockchain operation for a first cohort for a first user account, wherein the first cohort includes a plurality of user devices authorized to contribute to a digital signing process for blockchain operations corresponding to a cryptography-based storage application for the first user account; in response to receiving the first user request, generating a query to the plurality of user devices; receiving a response set to the query, wherein the response set comprises a respective response from at least one of the plurality of user devices; determining a threshold approval metric has been met based on the response set, wherein the threshold approval metric indicates a minimum number of approvals required to be received in response to the query; in response to the threshold approval metric being met, enabling a two-part approval, wherein the two-part approval requires approval using a first partial private key stored at the first user device and a second partial private key accessible to the remote server, wherein the first partial private key is not accessible to the remote server; and performing the blockchain operation following the two-part approval.

D2. The method of embodiment D1, wherein enabling the two-part approval comprises: retrieving, at the remote server, a second partial private key; generating a partial digital signature by contributing to the digital signing process using the second partial private key; and transmitting the partial digital signature to the first user device.

D3. The method of any of embodiments D1-D2, wherein performing the blockchain operation further comprises generating a digital signature by completing the digital signing process using the first partial private key.

D4. The method of any of embodiments D1-D3, further comprising: determining a characteristic of the first user device; and selecting the digital signing process based on the characteristic.

D5. The method of any of embodiments D1-D4, wherein determining that the threshold approval metric has been met further comprises: determining a first time at which the query was sent; determining a current time; determining a difference between the first time and the current time; and determining whether the difference meets a threshold time difference.

D6. The method of any of embodiments D1-D5, wherein the minimum number of approvals required to be received in response to the query is selected based on a percentage of the plurality of user devices.

D7. The method of any of embodiments D1-D6, wherein the response set further comprises endorsement by the at least one of the plurality of user devices of the blockchain operation using digital signatures generated using the respective partial private key of the at least one of the plurality of user devices.

D8. The method of any of embodiments D1-D7, wherein the response set comprises a verifiable endorsement, and wherein the first user device verifies all endorsements, verifies an approval policy for the first cohort is met.

D9. The method of any of embodiments D1-D8, wherein the response set comprises a video confirmation received from the at least one of the plurality of user devices.

D10. The method of any of embodiments D1-D9, wherein the two-part approval comprises retrieving the second partial private key from a cold storage application.

E1. A tangible, non-transitory, machine-readable medium storing instructions that, when executed by a data processing apparatus, cause the data processing apparatus to perform operations comprising those of any of embodiments A1-A10, B1-B9, C1-C11, or D1-D10.

E2. A system comprising one or more processors; and memory storing instructions that, when executed by the processors, cause the processors to effectuate operations comprising those of any of embodiments A1-A10, B1-B9, C1-C11, or D1-D10.

E3. A system comprising means for performing any of embodiments A1-A10, B1-B9, C1-C11, or D1-D10.

What is claimed is:

1. A system for requesting secure, encrypted communications across distributed computer networks for authorizing use of cryptography-based digital repositories in order to perform blockchain operations in decentralized applications, the system comprising:

a wallet corresponding to a plurality of partial private keys and associated with a user account;

a cohort comprising a plurality of user devices authorized to contribute to a blockchain digital signing process for blockchain operations corresponding to the wallet associated with the user account, wherein the partial private keys comprise a first partial private key generated and stored on a first user device of the user devices and a second partial private key generated and stored on a second user device of the user devices; and a remote server configured to:

receive, from the first user device, a user request to initiate a blockchain operation for the cohort, wherein the user request includes a first device identifier;

in response to authorizing, based on the first device identifier, the first user device for initiating the blockchain operation for the cohort, transmit, to the second user device, a signing request to contribute to the blockchain digital signing process for the blockchain operation;

receive, from the second user device, a response to the signing request, wherein the response comprises a second device identifier and a contribution to the blockchain digital signing process that is generated by the second user device using the second partial private key stored on the second user device; and in response to authorizing, based on the second device identifier, the second user device for contributing to the blockchain digital signing process, transmit, to the first user device, in connection with the user request from the first user device to initiate the blockchain operation, the contribution of the response generated using the second partial private key, the contribution of the response from the second user device being used with the first partial private key to generate a completed digital signature for performing the blockchain operation.

2. A method for requesting secure, encrypted communications across distributed computer networks for authorizing use of cryptography-based digital repositories in order to perform blockchain operations in decentralized applications, the method comprising:

generating, at a remote server, a first cohort for a first user account, wherein the first cohort includes a plurality of user devices authorized to contribute to a digital signing process for blockchain operations corresponding to a first cryptography-based, storage application for the first user account;

receiving, at the remote server from a first user device, a first user request to initiate a blockchain operation for the first cohort, wherein the first user request includes a first device identifier;

authorizing, at the remote server, the first user device based on the first device identifier;

in response to authorizing the first user device based on the first device identifier, transmitting, to a second user device, a first signing request to contribute to the digital signing process for the blockchain operation;

receiving, at the remote server from the second user device, a first response to the first signing request, wherein the first response comprises an encrypted communication and a second device identifier, wherein the encrypted communication comprises a contribution to the digital signing process based on a second partial private key, wherein the second partial private key is stored on the second user device;

authorizing, at the remote server, the second user device based on the second device identifier; and in response to authorizing the second user device based on the second device identifier, transmitting, to the first user device, the encrypted communication, wherein the encrypted communication is used to generate a completed digital signature using a first partial private key, wherein the first partial private key is stored on the first user device, and wherein the completed digital signature is used to perform the blockchain operation.

3. The method of claim 2, wherein authorizing the first user device is based on a cohort configuration protocol, wherein the cohort configuration protocol comprises:

an update policy, wherein the update policy indicates a threshold approval metric required for updating a cohort composition of the first cohort; and a signing policy, wherein the signing policy indicates a threshold signing metric for authorizing the first user device.

4. The method of claim 3, wherein the threshold signing metric corresponds to a maximum time period within which an approval is received from at least one of the plurality of user devices to authorize the respective device, and wherein authorizing the second user device further comprises:

determining a time period corresponding to the first response to the first signing request; and comparing the time period to the maximum time period.

5. The method of claim 2, wherein authorizing the first user device based on the first device identifier further comprises:

determining a plurality of device identifiers for the first cohort;

comparing the first device identifier to the plurality of device identifiers.

6. The method of claim 2, further comprising:

signing the blockchain operation with the completed digital signature; and submitting the blockchain operation to a blockchain node.

7. The method of claim 6, wherein submitting the blockchain operation to the blockchain node comprises:

determining, based on a database lookup, an address for the second cryptography-based, storage application;

generating, based on a blockchain protocol, an unsigned transaction;

determining a nonce value; and determining a gas limit by simulating the blockchain transaction.

8. The method of claim 6, further comprising:

determining, based on a database lookup, an address for the first cryptography-based, storage application;

generating, based on a blockchain protocol, encoded data comprising a method name and parameter into a binary data format;

transmit a call request to the blockchain node with the encoded data; and parsing the data related to a contract state based on a response from the call request.

9. The method of claim 2, wherein authorizing the first user device is further based on a first device authentication key pair, wherein the first device authentication key pair comprises a first device authentication public key and a first device authentication private key, wherein the first device authentication public key and the first device authentication public key are added to a first cohort generation input file, and wherein the first device authentication private key is stored only on the first user device.

10. The method of claim 2, wherein authorizing the first user device is further based a two-part approval, wherein the two-part approval requires approval using a first partial private key stored at the first user device and a third partial private key accessible to the remote server, wherein the first partial private key is not accessible to the remote server.

11. One or more non-transitory, computer-readable media comprising instructions that, when executed by one or more processors, causes operations comprising:

generating, at a remote server, a cohort for a user account, wherein the cohort includes a plurality of user devices authorized to contribute to a digital signing process for blockchain operations corresponding to a cryptography-based, storage application associated with the user account;

receiving, at the remote server, from a first user device, a user request to initiate a blockchain operation for the cohort, wherein the user request includes a first device identifier;

in response to authorizing, at the remote server, the first user device based on the first device identifier, transmitting, to a second user device, a signing request to contribute to the digital signing process for the blockchain operation;

receiving, at the remote server, from the second user device, a response to the signing request, wherein the response comprises a second device identifier and a contribution to the digital signing process that is generated based on a second partial private key stored on the second user device; and in response to authorizing, at the remote server, the second user device based on the second device identifier, transmitting, to the first user device, the contribution generated based on the second partial private key, wherein the contribution of the response from the second user device is used to generate a completed digital signature using a first partial private key stored on the first user device, and wherein the completed digital signature is used to perform the blockchain operation.

12. The one or more non-transitory, computer-readable media of claim 11, wherein authorizing the first user device is based on a cohort configuration protocol, wherein the cohort configuration protocol comprises:
an update policy, wherein the update policy indicates a threshold approval metric required for updating a cohort composition of the cohort; and
a signing policy, wherein the signing policy indicates a threshold signing metric for authorizing the first user device.

13. The one or more non-transitory, computer-readable media of claim 12, wherein the threshold signing metric corresponds to a maximum time period within which an approval is received from at least one of the user devices to authorize the respective device, and wherein authorizing the second user device further comprises:
determining a time period corresponding to the response to the signing request; and
comparing the time period to the maximum time period.

14. The one or more non-transitory, computer-readable media of claim 11, wherein transmitting the contribution comprises, in response to authorizing, at the remote server, the second user device based on a comparison of the second device identifier to a plurality of device identifiers associated with the cohort, transmitting, to the first user device, the contribution generated based on the second partial private key, wherein the contribution of the response from the second user device is used to generate the completed digital signature using a first partial private key stored on the first user device.

15. The one or more non-transitory, computer-readable media of claim 11, wherein the instructions cause further operations comprising:
signing the blockchain operation with the completed digital signature; and
submitting the blockchain operation to a blockchain node.

16. The one or more non-transitory, computer-readable media of claim 15, wherein submitting the blockchain operation to the blockchain node comprises:
determining, based on a database lookup, an address for a second cryptography-based, storage application;
generating, based on a blockchain protocol, a blockchain transaction;
determining a nonce value; and
determining a gas limit by simulating the blockchain transaction.

17. The one or more non-transitory, computer-readable media of claim 15, wherein the instructions cause further operations comprising:
determining, based on a database lookup, an address for the cryptography-based, storage application;
generating, based on a blockchain protocol, encoded data comprising a method name and parameter into a binary data format;
transmit a call request to the blockchain node with the encoded data; and
parsing the encoded data related to a contract state based on a given response from the call request.

18. The one or more non-transitory, computer-readable media of claim 11, wherein authorizing the first user device is further based a two-part approval, wherein the two-part approval requires approval using the first partial private key stored at the first user device and a third partial private key accessible to the remote server, wherein the first partial private key is not accessible to the remote server.

19. The one or more non-transitory, computer-readable media of claim 11, wherein authorizing the first user device is further based a two-part approval, wherein the two-part approval requires approval using the first partial private key stored at a cold wallet and a third partial private key stored at a hot wallet.

20. The one or more non-transitory, computer-readable media of claim 11, wherein:
a wallet, associated with the user account, corresponds to (i) the first partial private key stored on the first user device and (ii) the second partial private key stored on the second user device; and
the user devices of the cohort are authorized to contribute to the digital signing process for blockchain operations corresponding to the wallet associated with the user account.

* * * * *